(12) United States Patent
Owaki

(10) Patent No.: US 10,097,886 B2
(45) Date of Patent: Oct. 9, 2018

(54) SIGNAL PROCESSING DEVICE, RECORD/REPLAY DEVICE, SIGNAL PROCESSING METHOD, AND PROGRAM

(71) Applicant: Panasonic Intellectual Property Management Co., Ltd., Osaka (JP)

(72) Inventor: Yoshiaki Owaki, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/557,185

(22) PCT Filed: Mar. 23, 2016

(86) PCT No.: PCT/JP2016/001674
§ 371 (c)(1),
(2) Date: Sep. 11, 2017

(87) PCT Pub. No.: WO2016/157839
PCT Pub. Date: Oct. 6, 2016

(65) Prior Publication Data
US 2018/0041801 A1    Feb. 8, 2018

(30) Foreign Application Priority Data
Mar. 27, 2015 (JP) .................................. 2015-067536

(51) Int. Cl.
*H04N 5/765* (2006.01)
*H04N 5/775* (2006.01)
(Continued)

(52) U.S. Cl.
CPC ....... *H04N 21/44029* (2013.01); *G06T 5/009* (2013.01); *H04N 9/64* (2013.01);
(Continued)

(58) Field of Classification Search
CPC ....... H04N 21/44029; H04N 21/43635; H04N 21/4147; H04N 9/7925; H04N 9/64;
(Continued)

(56) References Cited

U.S. PATENT DOCUMENTS

2002/0110277 A1   8/2002  Ono et al.
2003/0001964 A1   1/2003  Masukura et al.
(Continued)

FOREIGN PATENT DOCUMENTS

EP    3013040 A1   4/2016
JP    2-033265     2/1990
(Continued)

OTHER PUBLICATIONS

International Search Report of PCT application No. PCT/JP2016/001674 dated Jun. 14, 2016.
(Continued)

*Primary Examiner* — Robert Chevalier
(74) *Attorney, Agent, or Firm* — McDermott Will & Emery LLP

(57) ABSTRACT

A signal processing device includes a converter and a selector. The converter converts an input video signal into the output video signal for the low-brightness display device. The selector selects one of the input video signal and the output video signal, and outputs the selected video signal to the display device. The selector selects the output video signal in a case where a high-brightness flag indicating a video signal for the high-brightness display device is added to the input video signal, and where information indicating that the display device is the low-brightness display device is acquired or information indicating that the display device is the high-brightness display device is not acquired, and selects the input video signal in a case where the high-brightness flag is not added to the input video signal.

13 Claims, 15 Drawing Sheets

(51) Int. Cl.

| | | |
|---|---|---|
| *H04N 21/4402* | (2011.01) | |
| *H04N 9/79* | (2006.01) | |
| *H04N 9/64* | (2006.01) | |
| *H04N 19/46* | (2014.01) | |
| *H04N 19/98* | (2014.01) | |
| *H04N 19/186* | (2014.01) | |
| *G06T 5/00* | (2006.01) | |
| *H04N 21/4363* | (2011.01) | |
| *H04N 21/4147* | (2011.01) | |
| *H04N 9/68* | (2006.01) | |
| *H04N 19/136* | (2014.01) | |

(52) U.S. Cl.
CPC ............. *H04N 9/68* (2013.01); *H04N 9/7925* (2013.01); *H04N 19/136* (2014.11); *H04N 19/186* (2014.11); *H04N 19/46* (2014.11); *H04N 19/98* (2014.11); *H04N 21/4147* (2013.01); *H04N 21/43635* (2013.01); *G06T 2207/10016* (2013.01)

(58) Field of Classification Search
CPC .......... H04N 9/68; H04N 19/46; H04N 19/98; H04N 19/136; H04N 19/186; G06T 5/009; G06T 2207/10016
USPC ................ 386/232, 230, 231, 248, 300, 326
See application file for complete search history.

(56) References Cited

U.S. PATENT DOCUMENTS

| | | |
|---|---|---|
| 2004/0004666 A1 | 1/2004 | Sano |
| 2012/0321273 A1 | 12/2012 | Messmer |
| 2014/0079113 A1 | 3/2014 | Newton et al. |
| 2014/0225941 A1 | 8/2014 | Van der Vleuten et al. |
| 2015/0208024 A1 | 7/2015 | Takahashi et al. |
| 2016/0134832 A1* | 5/2016 | Yamamoto ............. H04N 19/70 386/248 |
| 2016/0345040 A1* | 11/2016 | Oh ..................... H04N 21/2343 |

FOREIGN PATENT DOCUMENTS

| | | |
|---|---|---|
| JP | 2002-118752 | 4/2002 |
| JP | 2003-046859 | 2/2003 |
| JP | 2003-087785 | 3/2003 |
| JP | 2013-527996 | 7/2013 |
| JP | 2014-519620 | 8/2014 |
| JP | 2015-008024 | 1/2015 |
| WO | 2014/203746 A1 | 12/2014 |
| WO | 2015/008685 | 1/2015 |

OTHER PUBLICATIONS

The Extended European Search Report dated Mar. 22, 2018 for the related European Patent Application No. 16771728.9.
The Extended European Search Report dated Mar. 22, 2018 for the related European Patent Application No. 16771729.7.

* cited by examiner

SIGNAL PROCESSING DEVICE, RECORD/REPLAY DEVICE, SIGNAL PROCESSING METHOD, AND PROGRAM

This application is a U.S. national stage application of the PCT International Application No. PCT/JP2016/001674 filed on Mar. 23, 2016, which claims the benefit of foreign priority of Japanese patent application 2015-067536 filed on Mar. 27, 2015, the contents all of which are incorporated herein by reference.

TECHNICAL FIELD

The present disclosure relates to a signal processing device, a video recording/reproducing device, a signal processing method, and a program, which process a video signal conforming to a standard that handles a wider range than a standard dynamic range (hereinafter, this standard is referred to as a "standard that handles HDR (High Dynamic Range)").

BACKGROUND ART

Patent Literature 1 discloses a reproduction device that transmits HDR data and HDR information to a monitor having a wider dynamic range (range of brightness) than a standard one in order to make full use of performance of the monitor. Upon receiving the HDR data and the HDR information from this reproduction device, the monitor adjusts the HDR data based on the HDR information, and displays a video matched with characteristics of the monitor itself.

CITATION LIST

Patent Literature

PTL 1: Unexamined Japanese Patent Publication No. 2015-8024

SUMMARY

In some cases, HDR data is sent to a monitor having a standard dynamic range. The HDR data is a video signal with a brightness exceeding a brightness displayable by a standard monitor. Moreover, in the standard monitor, it is not assumed that such a video signal is input thereto, and the HDR data cannot be adjusted. Therefore, when the HDR data is displayed by the standard monitor while being left unadjusted, black floating (which refers to a phenomenon that a brightness of black looks increased) occurs in a low-brightness portion, and lightness becomes low in a high-brightness portion, and accordingly, it is apprehended that a contrast may be decreased to decrease image quality.

The present disclosure provides a signal processing device, a video recording/reproducing device, a signal processing method, and a program, which suppress the decrease of the image quality even in a case of inputting, to a monitor, such a video signal exceeding a capacity of the monitor.

The signal processing device in the present disclosure is a signal processing device that outputs a video signal to a display device. The signal processing device includes a converter and a selector. The converter converts an input video signal into an output video signal for a low-brightness display device in which an upper limit value of a range of a displayable brightness is smaller than an upper limit value in a high-brightness display device. The selector receives the input video signal and the output video signal, selects one of the input video signal and the output video signal, and outputs the selected video signal to the display device. The selector selects the output video signal in a case where a high-brightness flag indicating a video signal for the high-brightness display device is added to the input video signal, and where information indicating that the display device is the low-brightness display device is acquired or information indicating that the display device is the high-brightness display device is not acquired, and selects the input video signal in a case where the high-brightness flag is not added to the input video signal.

The signal processing method in the present disclosure is a signal processing method of outputting a video signal to a display device. The signal processing method includes: converting an input video signal into an output video signal for a low-brightness display device in which an upper limit value of a range of a displayable brightness is smaller than an upper limit value in a high-brightness display device; and selecting one of the input video signal and the output video signal and outputting the selected video signal to the display device, wherein the output video signal is selected in a case where a high-brightness flag indicating a video signal for the high-brightness display device is added to the input video signal, and where information indicating that the display device is the low-brightness display device is acquired or information indicating that the display device is the high-brightness display device is not acquired, and the input video signal is selected in a case where the high-brightness flag is not added to the input video signal.

The signal processing device, the video recording/reproducing device, the signal processing method and the program in the present disclosure can suppress the decrease of the image quality even when the video signal exceeding the capacity of the monitor is input to the monitor.

DESCRIPTION OF EMBODIMENTS

Figure 1:
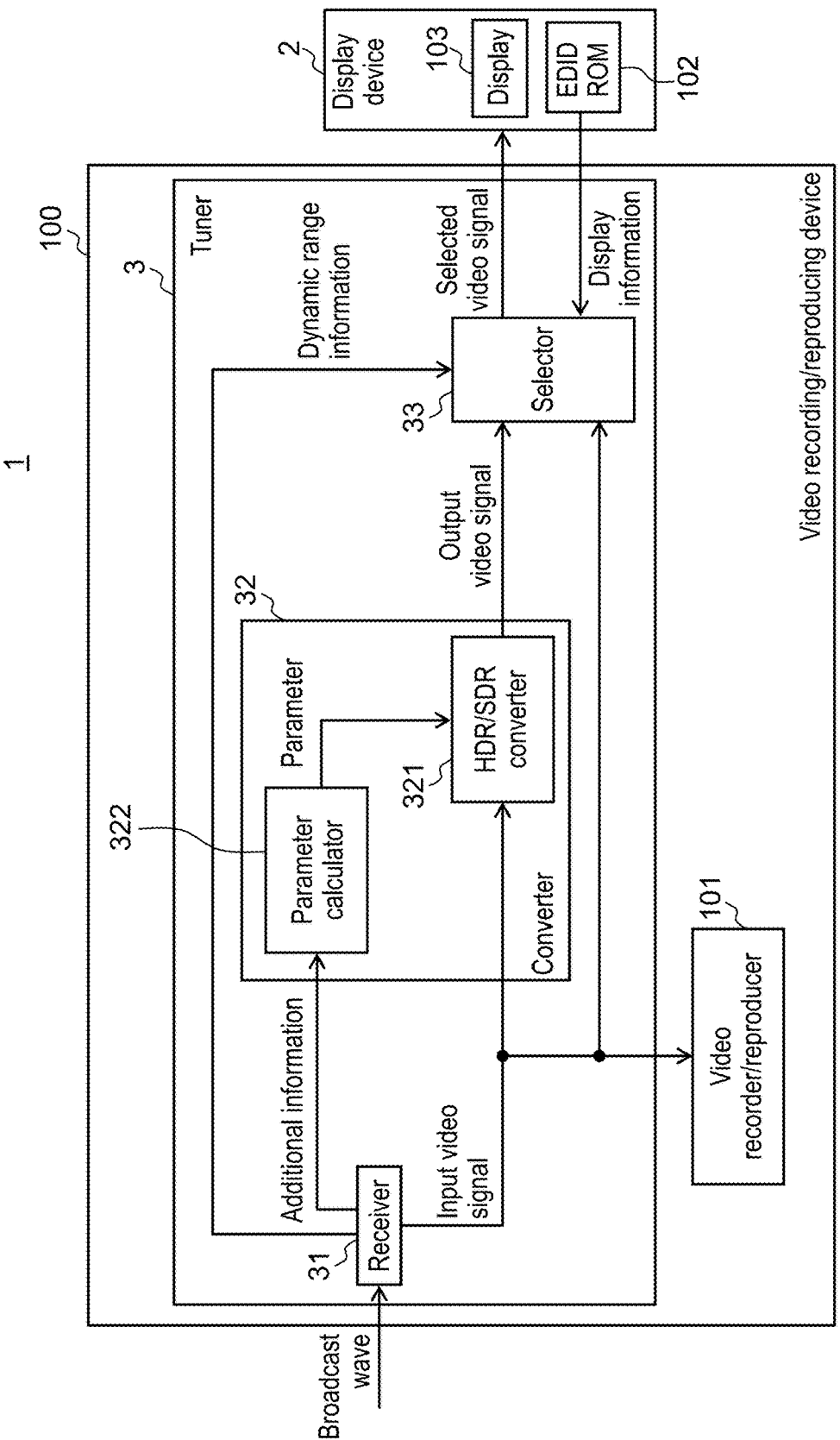
FIG. 1 is a block diagram schematically showing a configuration example of a display system in a first exemplary embodiment.

A description is made below in detail of embodiments with reference to the drawings as appropriate. However, a description more in detail than necessary is omitted in some cases. For example, a detailed description of a well-known item and a duplicate description of substantially the same configuration are omitted in some cases. These omissions are made in order to avoid unnecessary redundancy of the following description and to facilitate the understanding of those skilled in the art.

Note that the accompanying drawings and the following description are provided in order to allow those skilled in the art to fully understand the present disclosure, and it is not intended to thereby limit the subject described in the scope of claims.

Moreover, the respective drawings are schematic views, and are not illustrated necessarily exactly. Furthermore, in the respective drawings, in some cases, the same reference numerals are assigned to the same constituent elements, and a description thereof is omitted or simplified.

First Exemplary Embodiment

A description is made below of a first exemplary embodiment with reference to FIG. 1 to FIG. 8.

[1-1. Configuration]

[1-1-1. Display Device]

FIG. 1 is a block diagram schematically showing a configuration example of display system 1 in the first exemplary embodiment.

In the first exemplary embodiment, display system 1 includes display device 2 and video recording/reproducing device 100.

For example, display device 2 is a television set (hereinafter, referred to as a "television") that displays a video on display 103 (display panel) by receiving a broadcast wave. Display device 2 includes display 103 and EDID (Extended display identification data) ROM (Read Only Memory) 102.

Video recording/reproducing device 100 is, for example, a video recorder that can record a video signal, which is obtained by receiving the broadcast wave, in an HDD (Hard Disk Drive), an optical disc, a semiconductor memory or the like. Video recording/reproducing device 100 transmits, to display device 2, a reproduced signal (reproduced video signal) and/or a video signal (received video signal) obtained by receiving the broadcast wave, and can thereby display a video, which is brought by this video signal, on display 103 of display device 2.

Video recording/reproducing device 100 includes video recorder/reproducer 101 and tuner 3. Video recorder/reproducer 101 can record the video signal obtained by receiving the broadcast wave in tuner 3. Moreover, video recorder/reproducer 101 can output the reproduced video signal obtained by reproducing the recorded video signal. Note that, in FIG. 1, a transmission path of the reproduced video signal output from video recorder/reproducer 101 is omitted. Functions owned by video recorder/reproducer 101 are substantially the same as video recording/reproducing functions provided in general video recorders, and accordingly, a detailed description thereof is omitted.

Video recording/reproducing device 100 and display device 2 are connected to each other by, for example, an HDMI (High-Definition Multimedia Interface) (registered trademark) cable. Video recording/reproducing device 100 can transmit the video signal to display device 2 through this HDMI cable.

Note that a cable that connects video recording/reproducing device 100 and display device 2 to each other is not limited to the HDMI cable. Video recording/reproducing device 100 and display device 2 may be connected to each other by a generally used video cable or other cables. Alternatively, video recording/reproducing device 100 and display device 2 may be connected to each other by radio such as Bluetooth (registered trademark).

Note that, in this exemplary embodiment, a description is made of an operation example where video recording/reproducing device 100 transmits the video signal (received video signal), which is obtained by receiving the broadcast wave, to display device 2. A description of an operation where video recording/reproducing device 100 transmits the reproduced video signal to display device 2 is omitted. In this exemplary embodiment, these two operations are substantially the same except for whether the video signal is the reproduced video signal or the received video signal.

Note that FIG. 1 only shows constituents, which are related to this exemplary embodiment, among a plurality of constituents provided in video recording/reproducing device 100, and the other constituents are omitted. The other constituents include constituents provided generally in a video recorder. A description of these constituents is omitted. Moreover, FIG. 1 only shows constituents, which are related to this exemplary embodiment, among a plurality of constituents provided in display device 2, and the other constituents are omitted. The other constituents include constituents provided generally in a television. A description of these constituents is omitted.

Display device 2 receives a video signal sent from tuner 3 of video recording/reproducing device 100, and displays a video on display 103 based on the video signal. As display 103 provided in display device 2, for example, a liquid crystal display panel, an organic EL (Electro Luminescence) display panel and the like are mentioned. In display 103, a displayable brightness range (dynamic range) is determined. Here, a description is made of a configuration example where display device 2 includes display 103 capable of display in a standard dynamic range.

In EDID ROM 102 provided in display device 2, information is stored, the information indicating whether display 103 provided in display device 2 is a panel capable of the display in the standard dynamic range or a panel capable of display in a dynamic range larger than the standard dynamic range. In this exemplary embodiment, information indicating that the panel is capable of the display in the standard dynamic range is referred to as "SDR (Standard Dynamic Range) information", and information indicating that display 103 is the panel capable of the display in the dynamic range larger than the standard dynamic range is referred to as "HDR information". That is to say, the SDR information is an example of information indicating that display device 2 is a low-brightness display device, and the HDR information is an example of information indicating that display device 2 is a high-brightness display device.

Display device 2 transmits the SDR information or the HDR information as display information to video recording/reproducing device 100 at predetermined timing. The display information may be bit data, for example, in which "0" represents the SDR information, and "1" represents the HDR information. The predetermined timing is, for example, timing when display device 2 is turned on; however, may be other timing. The predetermined timing may be, for example, timing when an acquisition request for the display information is transmitted from video recording/reproducing device 100 to display device 2. The display information is transmitted from display device 2 to video recording/reproducing device 100, for example, through a DDC (Display Data Channel) line of the HDMI cable that connects video recording/reproducing device 100 and display device 2 to each other. By the display information transmitted from display device 2, video recording/reproducing device 100 can perceive whether display 103 provided in display device 2 is the panel capable of the display in the standard dynamic range or the panel capable of the display in the dynamic range larger than the standard dynamic range.

Note that, in this exemplary embodiment, it is assumed that an upper limit value of the standard dynamic range is set, for example, to 100 cd/m$^2$ (=100 nit), and a range of 0% to 100% of the upper limit value is defined as the standard dynamic range. A dynamic range larger than the standard dynamic range is shown as a range of 101% or more. A dynamic range conforming to a standard that handles HDR takes an approximate range of 0% to 10000%.

This exemplary embodiment illustrates a case where a video signal conforming to the standard that handles HDR is defined as a video signal for a high-brightness display device, and a video signal corresponding to the standard dynamic range is defined as a video signal for a low-brightness display device. The high-brightness display device is a display device capable of displaying the dynamic range larger than the standard dynamic range, and for example, is a display device capable of displaying the video signal conforming to the standard that handles HDR. The low-brightness display device is a display device smaller than the high-brightness display device in terms of an upper limit value of the displayable brightness, and for example, is a display device capable of displaying the video signal corresponding to the standard dynamic range.

As mentioned above, in this exemplary embodiment, the description is made of the configuration example where display device 2 is the low-brightness display device. Hence, in this exemplary embodiment, a description is made of an operation example where display device 2 transmits the SDR information as the display information to video recording/reproducing device 100. Note that display device 2 may be the high-brightness display device. In this case, display device 2 transmits the HDR information as the display information to video recording/reproducing device 100. Note that video recording/reproducing device 100 may determine that display device 2 is the low-brightness display device in a case where neither the SDR information nor the HDR information is transmitted from display device 2.

[1-1-2. Tuner]

Tuner 3 is a signal processing device that converts a broadcast wave, which is input through an antenna, into a video signal, and outputs the video signal.

Tuner 3 is realized, for example, as a 1-chip semiconductor integrated circuit such as an LSI (Large Scale Integrated Circuit). Tuner 3 includes receiver 31, converter 32 and selector 33. Note that receiver 31, converter 32 and selector 33 may be realized by a plurality of integrated circuits, or may be realized by pluralities of individual circuits and discrete components.

Receiver 31 is a circuit that converts the broadcast wave, which is input through the antenna, into an input video signal.

To the input video signal, there is added dynamic range information that indicates a type of a dynamic range of a video by the input video signal. For example, in a case where the input video signal is the video signal for the high-brightness display device, an HDR flag (high-brightness flag) is added as the dynamic range information to the input video signal. Meanwhile, in a case where the input video signal is the video signal for the low-brightness display device, an SDR (Standard Dynamic Range) flag (low-brightness flag) is added as the dynamic range information. Moreover, additional information is added to the input video signal in advance.

The additional information includes a value related to the brightness of the input video signal. Specifically, as the value related to the brightness of the input video signal, there are mentioned: a maximum brightness in one frame of the input video signal; an average brightness in one frame of the input video signal; an average maximum brightness per frame, which is calculated from maximum brightnesses in a predetermined number of frames of the input video signal; a brightness histogram in one frame of the input video signal; and a motion vector per unit pixel block included in the input video signal.

This exemplary embodiment is described by illustrating a case where the maximum brightness in one frame of the input video signal is added to the input video signal of each frame. Note that the same additional information may be added to a whole of such input video signals which compose one content. In this case, as the additional information, for example, there may be defined at least one of respective average values of the maximum brightnesses, the average brightnesses, the brightness histograms and the motion vectors, which are obtained from all frames which compose one content.

Note that, at a time of recording the input video signal, video recorder/reproducer 101 may store dynamic range information and additional information, which are related to the input video signal, in addition to the input video signal. Moreover, at a time of reproducing the recorded video signal, video recorder/reproducer 101 may output dynamic range information and additional information, which are related to the reproduced video signal, in addition to the reproduced video signal.

Receiver 31 outputs the additional information, which is added to the input video signal, to parameter calculator 322 of converter 32. Moreover, receiver 31 outputs the input video signal to selector 33 and HDR/SDR converter 321 of converter 32. Furthermore, receiver 31 outputs the dynamic range information, which is added to the input video signal, to selector 33.

Note that, at the time of reproducing the recorded video signal, video recorder/reproducer 101 may output the reproduced video signal to selector 33 and HDR/SDR converter 321 of converter 32. Moreover, at the time of reproducing the recorded video signal, video recorder/reproducer 101 may output additional information, which is related to the reproduced video signal, to parameter calculator 322 of converter 32, and may output dynamic range information, which is related to the reproduced video signal, to selector 33. Note that signal paths of these are omitted in FIG. 1.

A description is made below of an operation example where tuner 3 operates based on the input video signal output from receiver 31; however, in a case where the recorded video signal is reproduced by video recorder/reproducer 101, the following input video signal just needs to be interpreted as the reproduced video signal.

Converter 32 is a circuit that generates an output video signal in such a manner as follows. That is, converter 32 converts the input video signal including the video signal, which is for the high-brightness display device, into the video signal, which is for the low-brightness display device which has a smaller upper limit value of the range of the displayable brightness than the high-brightness display device. Specifically, converter 32 includes HDR/SDR converter 321 and parameter calculator 322.

HDR/SDR converter 321 is a circuit that generates the output video signal in such a manner as follows. That is, HDR/SDR converter 321 implements brightness conversion processing for the input video signal by using a parameter calculated by parameter calculator 322.

Figure 2:
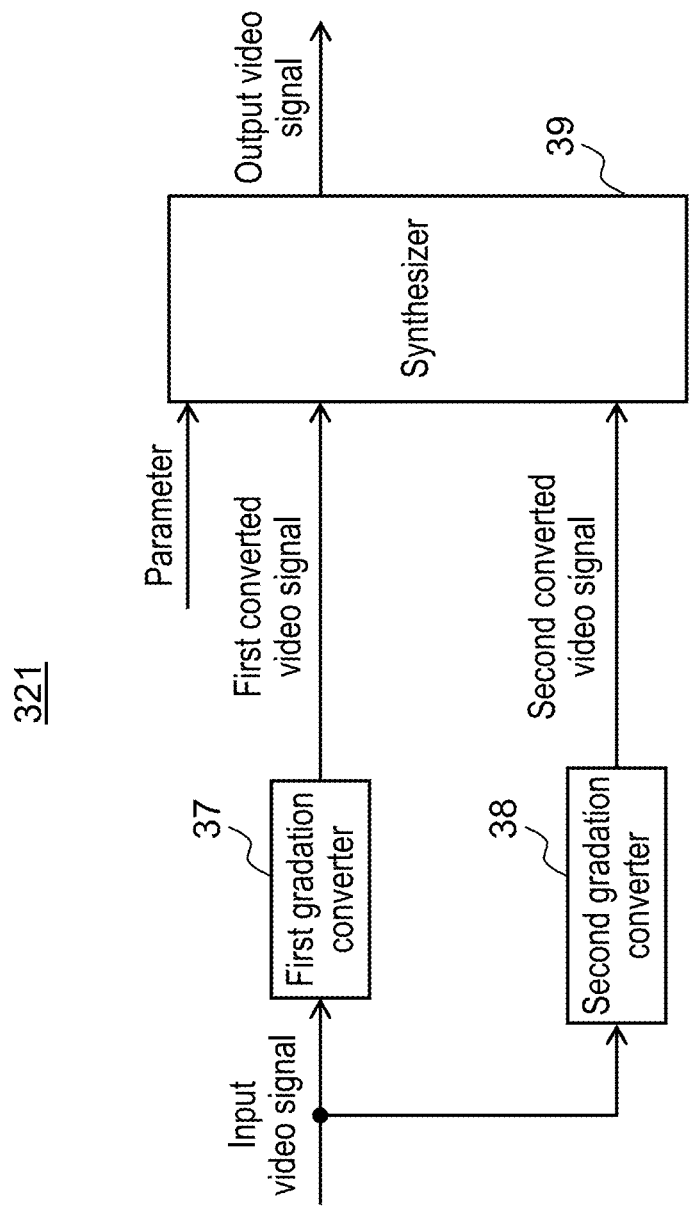
FIG. 2 is a block diagram schematically showing a configuration example of an HDR/SDR converter in the first exemplary embodiment.

FIG. 2 is a block diagram schematically showing a configuration example of HDR/SDR converter 321 in the first exemplary embodiment.

HDR/SDR converter 321 includes first gradation converter 37, second gradation converter 38 and synthesizer 39.

Figure 3:
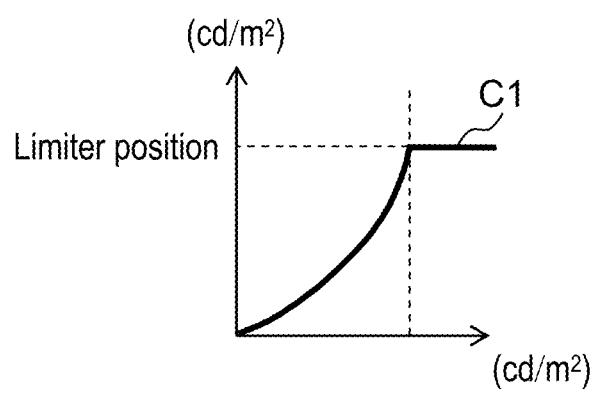
FIG. 3 is a graph showing an example of a first conversion characteristic curve in the first exemplary embodiment.

First gradation converter 37 is a circuit that converts the brightness of the input video signal by using first conversion characteristic curve C1 (refer to FIG. 3). First gradation converter 37 outputs a first converted video signal after the conversion to synthesizer 39.

Figure 4:
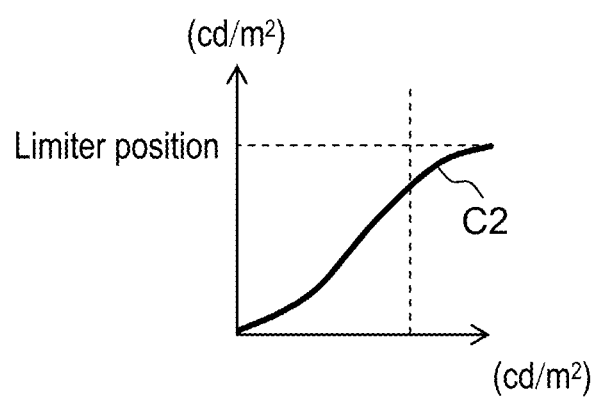
FIG. 4 is a graph showing an example of a second conversion characteristic curve in the first exemplary embodiment.

Second gradation converter 38 is a circuit that converts the brightness of the input video signal by using second conversion characteristic curve C2 (refer to FIG. 4). Second gradation converter 38 outputs a second converted video signal after the conversion to synthesizer 39.

Here, a description is made of first conversion characteristic curve C1 and second conversion characteristic curve C2.

FIG. 3 is a graph showing an example of first conversion characteristic curve C1 in the first exemplary embodiment.

FIG. 4 is a graph showing an example of second conversion characteristic curve C2 in the first exemplary embodiment.

First conversion characteristic curve C1 and second conversion characteristic curve C2 are merely examples, and are changeable as long as staying within a range that meets a purpose of the brightness conversion. Moreover, in each of FIG. 3 and FIG. 4, an axis of abscissas represents the brightness of the input video signal, and an axis of ordinates represents the brightness of the output video signal after the conversion. Moreover, a limiter position of the axis of ordinates is the upper limit value of the dynamic range displayable by display 103 provided in display device 2.

Figure 5:
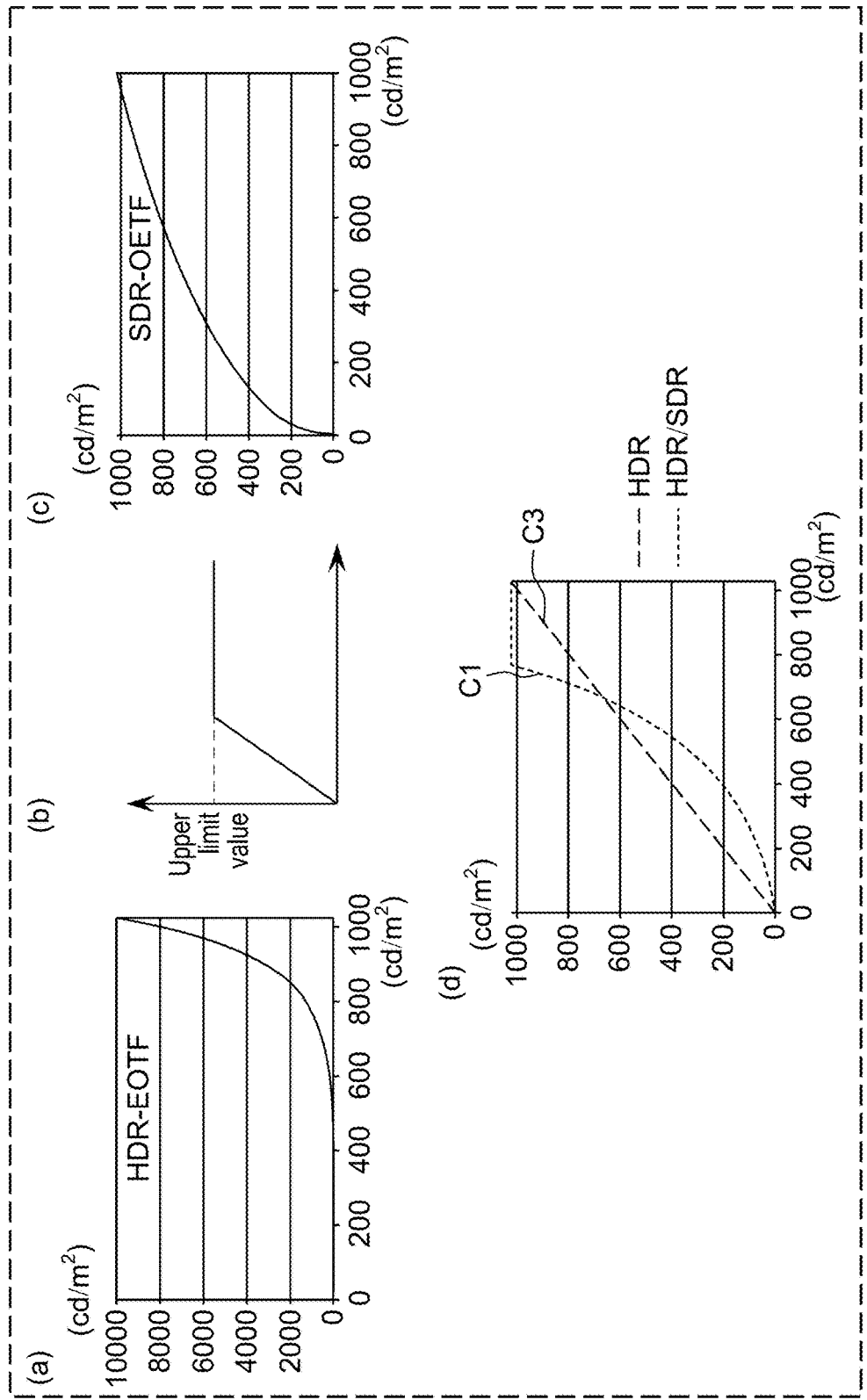
FIG. 5 is diagrams for showing a theory in creating the first conversion characteristic curve in the first exemplary embodiment.

FIG. 5 is diagrams for showing a theory in creating first conversion characteristic curve C1 in the first exemplary embodiment. Note that, in each of such graphs in FIG. 5, an axis of abscissas represents the brightness of the input video signal, and an axis of ordinates represents the brightness of the output video signal.

The input video signal is already corrected by OETF (Optical-Electro Transfer Function). EOTF (Electro-Optical Transfer Function) corresponding to this OETF is prepared. FIG. 5(a) shows an example of this EOTF (written as HDR-EOTF in FIG. 5).

FIG. 5(b) is an example of a complement graph matched with the upper limit value of the dynamic range displayable in display 103 of display device 2.

Moreover, OETF corresponding to EOTF expected by display 103 of display device 2 is prepared. FIG. 5(c) shows an example of this OETF (written as SDR-OETF in FIG. 5).

The respective graphs shown in FIGS. 5(a) to 5(c) are multiplied with one another, whereby first conversion characteristic curve C1 shown in FIG. 5(D) is calculated.

Note that FIG. 5(d) shows, as a comparative example, conversion characteristic curve C3 in a case of displaying the input video signal, which conforms to the standard that handles HDR, on the display corresponding to the standard that handles HDR. Conversion characteristic curve C3 is a linear graph as a whole. Meanwhile, first conversion characteristic curve C1 is a graph having a non-linear portion and a linear portion. The linear portion of first conversion characteristic curve C1 is a horizontal segment that takes a value of the limiter position as a reference.

This linear portion of first conversion characteristic curve C1 is a portion of converting a signal in the input video signal, the signal having a brightness exceeding the limiter position (upper limit value of the range of the brightness displayable by display 103), into a signal having a brightness of the value of the limiter position (or a value approximate to the value of the limiter position). In such a way, the input video signal with the brightness exceeding the limiter position is converted by the linear portion into the signal with the upper limit value of the dynamic range displayable by display 103. Note that the value on the linear portion after the conversion does not have to be equal to the value of the limiter position, and may be a value approximate to the value of the limiter position.

Note that display device 2 may transmit information, which indicates the dynamic range displayable by display 103 or the upper limit value of the dynamic range displayable by display 103, to video recording/reproducing device 100 together with the display information. In such a way, video recording/reproducing device 100 can perceive the upper limit value of the dynamic range displayable by display 103.

The non-linear portion of first conversion characteristic curve C1 is a portion of converting the brightness of the signal in the input video signal, the brightness remaining within the dynamic range (range of the brightness) displayable by display 103 provided in display device 2, so that the brightness can be based on a predetermined standard. The predetermined standard is a standard that is based on the dynamic range of the video by the input video signal, and based on the dynamic range displayable by display 103. Specifically, as mentioned above, the predetermined standard is a standard obtained by synthesizing three graphs shown in FIGS. 5(a) to 5(c). Note that the predetermined standard is not limited to this, and standards obtained by varieties of experiments, simulations and the like may be used.

When the brightness of the input video signal is converted based on this first conversion characteristic curve C1, a converted video signal is generated, which has lightness close to original lightness inherent in the input video signal, and meanwhile, in a high-brightness portion, may possibly include a pseudo contour, a halation (that is a loss of gradation in the high-brightness portion in the display video), and the like.

As shown in FIG. 4, second conversion characteristic curve C2 is a graph that does not have a horizontal linear portion. Then, in second conversion characteristic curve C2, only the upper limit value of the range of the brightness of the input video signal is converted into the value of the limiter position. By using this second conversion characteristic curve C2, the brightness of the input video signal is reduced so as to remain within the dynamic range (range of brightness) displayable by display 103 provided in display device 2, and is converted into the output video signal.

Note that, as second conversion characteristic curve C2, for example, a graph linear as a whole, which is like conversion characteristic curve C3 shown in FIG. 5(d), can also be used.

When the brightness of the input video signal is converted based on this second conversion characteristic curve C2, a converted video signal is generated, which maintains the gradation characteristics though becoming darker than the original lightness inherent in the input video signal.

As shown in FIG. 2, synthesizer 39 is a circuit that synthesizes the first converted video signal input from first gradation converter 37 and the second converted video signal input from second gradation converter 38 with each other in a predetermined ratio (hereinafter, also referred to as a "ratio of use"), and outputs the signal, which is thus obtained by the synthesis, as the output video signal to selector 33. Specifically, synthesizer 39 defines a parameter, which is input from parameter calculator 322, as the predetermined ratio, and generates the output video signal by following Equation 1.

Output video signal=first converted video signal×(1−parameter)+second converted video signal×parameter    (Equation 1)

As shown in FIG. 1, parameter calculator 322 is a circuit that calculates the parameter for converting the input video signal. Parameter calculator 322 calculates the parameter based on the additional information input from receiver 31. Here, the parameter refers to the ratio of use between first conversion characteristic curve C1 and second conversion characteristic curve C2, which are used in synthesizer 39. Specifically, the parameter is a ratio of the first converted video signal that is based on first conversion characteristic curve C1 and the second converted video signal that is based on second conversion characteristic curve C2 in an event of synthesizing both of them with each other.

Figure 6:
FIG. 6 is a block diagram schematically showing a configuration example of a parameter calculator in the first exemplary embodiment.

FIG. 6 is a block diagram schematically showing a configuration example of parameter calculator 322 in the first exemplary embodiment.

As shown in FIG. 6, parameter calculator 322 includes gain calculator 35 and time constant processor 36.

Gain calculator 35 is a circuit that calculates gain information based on the maximum brightness input as the additional information from receiver 31. Specifically, gain calculator 35 calculates the gain information from the maximum brightness by using a first threshold value, a second threshold value larger than the first threshold value, and a graph shown below.

Figure 7:
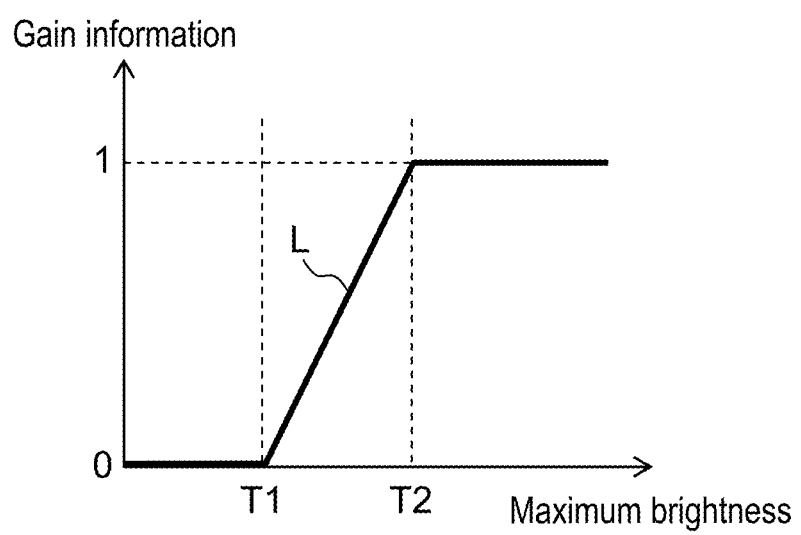
FIG. 7 is a graph showing an example of a relationship between gain information and a maximum brightness in the first exemplary embodiment.

FIG. 7 is a graph showing an example of a relationship between the gain information and the maximum brightness in the first exemplary embodiment.

As shown in FIG. 7, gain calculator 35 sets the gain information to "0" in a case where the maximum brightness is equal to or less than first threshold value T1, and sets the gain information to "1" in a case where the maximum brightness is equal to or more than second threshold value T2. Moreover, the graph shown in FIG. 7 is a linear graph, which connects "0" and "1" to each other, between first threshold value T1 and second threshold value T2. Therefore, gain calculator 35 defines a value, which is based on this linear portion L, as the gain information in a case where the maximum brightness stays between first threshold value T1 and second threshold value T2. This value is the predetermined ratio.

Note that first threshold value T1 and second threshold value T2 are set to appropriate values based on varieties of experiments, simulations and the like. Specifically, first threshold value T1 just needs to be a value approximate to the upper limit value of the dynamic range displayable by display 103 provided in display device 2. Moreover, second threshold value T2 just needs to be larger than first threshold value T1.

As shown in FIG. 6, time constant processor 36 is a circuit that calculates a parameter, which will be used next, based on current gain information calculated by gain calculator 35, and based on a parameter used immediately before, and outputs the calculated parameter to HDR/SDR converter 321. Specifically, time constant processor 36 calculates the parameter, for example, from Equation 2 shown below.

Parameter=calculated gain information×α+parameter used immediately before×(1−α)    (Equation 2)

α is a weighting coefficient, and is a value that satisfies a following relationship: 0≤α≤1. α is set to an appropriate value based on varieties of experiments and/or simulations.

As shown in FIG. 1, selector 33 is a circuit that receives the input video signal, the output video signal obtained by converting the input video signal by converter 32, the dynamic range information and the display information, selects either one of the input video signal and the output video signal based on the dynamic range information and the display information, and outputs the selected signal to display device 2.

Specifically, in a case of having received the HDR flag as the dynamic range information, and having acquired the SDR information as the display information from display device 2, selector 33 selects the output video signal, and outputs the output video signal to display device 2. In other words, in a case where the input video signal is the video signal for the high-brightness display device, and display device 2 is the low-brightness display device, selector 33 selects the output video signal, and outputs the output video signal to display device 2. Moreover, in a case of having received the SDR flag as the dynamic range information, and having acquired the SDR information as the display information from display device 2, selector 33 selects the input video signal, and outputs the input video signal to display device 2. In other words, in a case where the input video signal is the video signal for the low-brightness display device, and display device 2 is the low-brightness display device, selector 33 selects the input video signal, and outputs the input video signal to display device 2.

Note that, in a case of having acquired the HDR information as the display information from display device 2, selector 33 may select the input video signal and output the input video signal to display device 2 regardless of the dynamic range information. Moreover, in a case of having received the SDR flag or not having received the HDR flag, selector 33 may select the input video signal and output the input video signal to display device 2 regardless of the display information. Moreover, in a case of having received neither the SDR flag nor the HDR flag, selector 33 may operate on the assumption of having received the SDR flag. Moreover, in a case where neither the SDR information nor the HDR information is transmitted from display device 2, the selector 33 may operate on the assumption of having acquired the SDR information as the display information.

[1-2. Operations]

A description is made below of operations of tuner 3 configured as described above.

Figure 8:
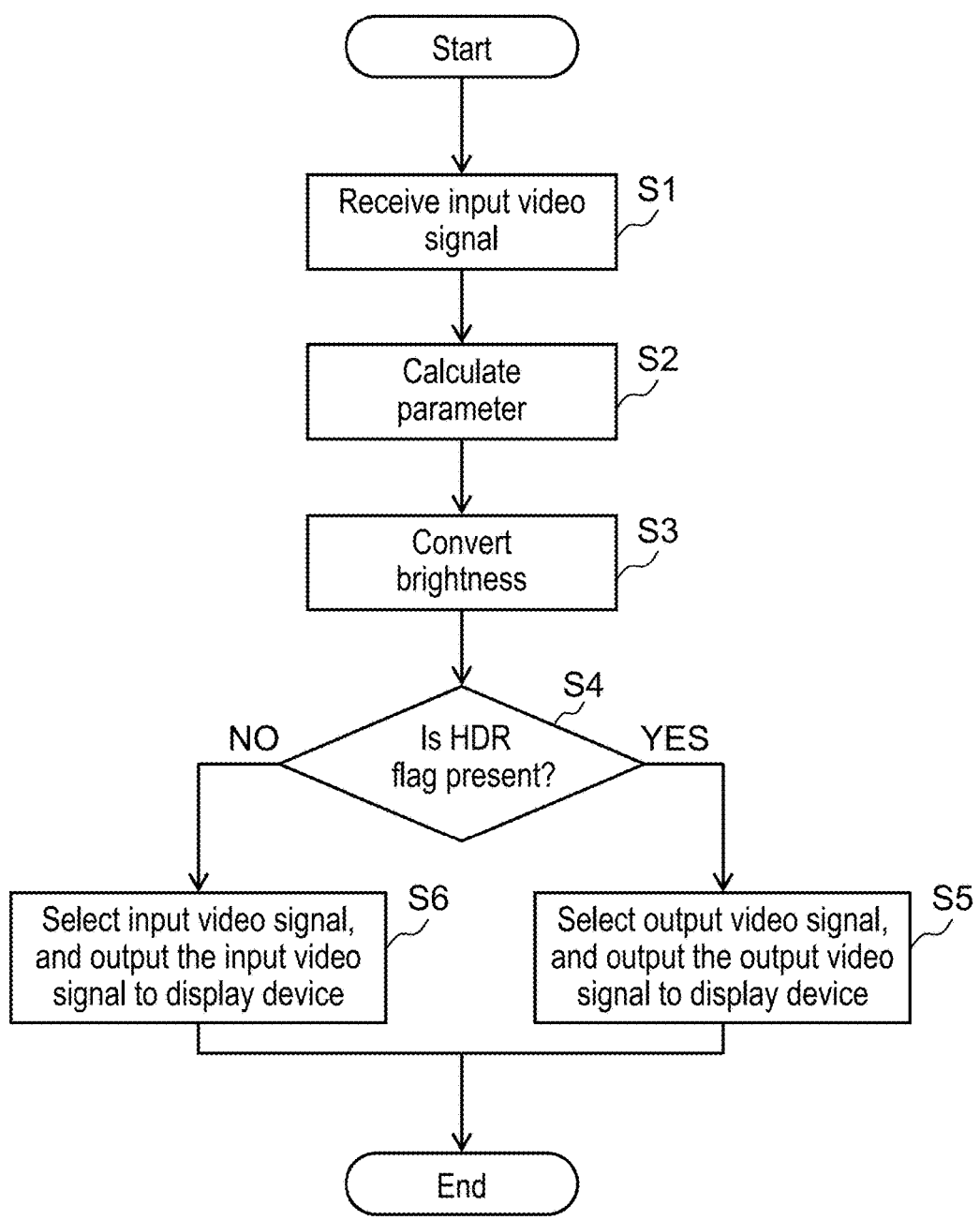
FIG. 8 is a flowchart showing an example of a signal processing method executed in a tuner in the first exemplary embodiment.

FIG. 8 is a flowchart showing an example of a signal processing method executed in tuner 3 in the first exemplary embodiment.

Upon receiving the broadcast wave from the antenna, receiver 31 converts the received broadcast wave into the input video signal. Then, receiver 31 outputs the additional information, which is added to the input video signal, to parameter calculator 322. Moreover, receiver 31 outputs the input video signal to HDR/SDR converter 321 and selector 33. Furthermore, receiver 31 outputs the dynamic range information, which is added to the input video signal, to selector 33 (Step S1).

Note that, at the time of reproducing the recorded video signal, video recorder/reproducer 101 outputs the reproduced video signal to HDR/SDR converter 321 and selector 33. Moreover, video recorder/reproducer 101 may output additional information, which is related to the reproduced video signal, to parameter calculator 322, and outputs dynamic range information, which is related to the reproduced video signal, to selector 33.

Parameter calculator 322 calculates the parameter based on the additional information input from receiver 31 (or video recorder/reproducer 101), and outputs the calculated parameter to HDR/SDR converter 321 (Step S2).

HDR/SDR converter 321 performs brightness conversion, which is based on the parameter, for the input video signal input from receiver 31 (or the reproduced video signal from video recorder/reproducer 101), thereby converts the input video signal (or the reproduced video signal) into the output video signal, and outputs the output video signal to selector 33 (Step S3).

Selector 33 determines whether or not the HDR flag has been input from receiver 31 (or video recorder/reproducer 101). Moreover, selector 33 confirms the display information acquired from display device 2 (Step S4).

In a case of having determined that the HDR flag has been input and having determined that the SDR information has been acquired as the display information in Step S4 (YES in Step S4), selector 33 selects the output video signal and outputs the selected output video signal to display device 2 (Step S5).

In a case of having determined that the HDR flag has not been input and having determined that the SDR information has been acquired as the display information in Step S4 (NO in Step S4), selector 33 selects the input video signal and outputs the selected input video signal to display device 2 (Step S6).

Note that, in a case of having determined that the HDR information has been input as the display information in Step S4, selector 33 may advance the processing to Step S6.

Tuner 3 executes processing, which is based on this flowchart, for the input video signal (or the reproduced video signal) of each frame. At the time when the parameter is calculated, such a parameter used immediately before (one frame before) is reflected on the parameter, which is calculated at present, by Equation 2 mentioned above. Therefore, even at timing when the gain information is switched from 1 to 0, tuner 3 can reduce a difference between the parameter used immediately before and the parameter calculated at present. That is to say, in tuner 3, at the time when the output video signal is generated, the parameter for use as the ratio of use can be prevented from being suddenly switched every frame. In such a way, display device 2 can suppress generation of flickering for each frame on the video to be displayed on display 103.

[1-3. Effects and the Like]

As described above, in this exemplary embodiment, the signal processing device is a signal processing device that outputs a video signal to a display device. The signal processing device includes a converter and a selector. The converter converts an input video signal into an output video signal for a low-brightness display device in which an upper limit value of a range of a displayable brightness is smaller than an upper limit value in a high-brightness display device. The selector receives the input video signal and the output video signal, selects one of the input video signal and the output video signal, and outputs the selected video signal to the display device. The selector selects the output video signal in a case where a high-brightness flag indicating a video signal for the high-brightness display device is added to the input video signal, and where information indicating that the display device is the low-brightness display device is acquired or information indication that the display device is the high-brightness display device is not acquired, and selects the input video signal in a case where the high-brightness flag is not added to the input video signal.

Moreover, in this embodiment, the video recording/reproducing device includes the signal processing device and a video recorder/reproducer.

Moreover, in this exemplary embodiment, the signal processing method is a signal processing method of outputting a video signal to a display device. The signal processing method includes: converting an input video signal into an output video signal for a low-brightness display device in which an upper limit value of a range of a displayable brightness is smaller than an upper limit value in a high-brightness display device; and selecting one of the input video signal and the output video signal and outputting the selected video signal to the display device, wherein the output video signal is selected in a case where a high-brightness flag indicating a video signal for the high-brightness display device is added to the input video signal, and where information indicating that the display device is the low-brightness display device is acquired, and the input video signal is selected in a case where the high-brightness flag is not added to the input video signal.

Note that display device 2 is an example of the display device, and is also an example of the low-brightness display device. Tuner 3 is an example of the signal processing device. Converter 32 is an example of the converter. Selector 33 is an example of the selector. The SDR information is an example of the information indicating that the display device is the low-brightness display device. Video recording/reproducing device 100 is an example of the video recording/reproducing device. Video recorder/reproducer 101 is an example of the video recorder/reproducer.

For example, in the example shown in the first exemplary embodiment, in tuner 3, in the case where the high-brightness flag (HDR flag) is added to the input video signal, and the SDR information indicating that display device 2 is the low-brightness display device is acquired from display device 2, or in the case where the HDR information indicating that display device 2 is the high-brightness display device is not acquired from display device 2, then selector 33 selects the output video signal, and outputs the output video signal to display device 2. The output video signal is a signal obtained by converting the brightness of the input video signal (or the reproduced video signal) so as to correspond to the range of the brightness displayable by display 103 of display device 2.

As described above, in tuner 3, the input video signal (or the reproduced video signal) exceeding a display capability (dynamic range) of display 103 provided in display device 2 is converted into the output video signal matched with the display capability (dynamic range) of display 103. Selector 33 selects this output video signal, and outputs the selected output video signal to display device 2. Hence, in the case of outputting, to display device 2, the input video signal (or the reproduced video signal) that has the brightness exceeding the upper limit of the brightness displayable by display 103 of display device 2, video recording/reproducing device 100 including tuner 3 can suppress the decrease of the image quality, and can allow display 103 of display device 2 to display the video, which is based on the input video signal (or the reproduced video signal).

Moreover, in the case where the HDR flag is not added to the input video signal, selector 33 selects the input video signal, and outputs the selected input video signal to display device 2. The input video signal that is not added with the HDR flag is a video signal conforming to the standard dynamic range. Hence, even if display device 2 is a display device capable of displaying a video in the standard dynamic range, video recording/reproducing device 100 can display the video, which is based on the input video signal (or the reproduced video signal), with sufficient image quality on display 103 of display device 2.

In the signal processing device, the converter may convert the input video signal (or the reproduced video signal) into the output video signal by using at least one of at least two types of conversion characteristic curves.

Note that first conversion characteristic curve C1 and second conversion characteristic curve C2 are examples of the conversion characteristic curves.

For example, in the example shown in the first exemplary embodiment, in tuner 3, converter 32 converts the input video signal (or the reproduced video signal) into the output video signal by using at least one of at least two types of the conversion characteristic curves (for example, first conversion characteristic curve C1 and second conversion characteristic curve C2). Hence, tuner 3 can convert the input video signal (or the reproduced video signal) into the output video signal by using a conversion characteristic curve in which priority is given to the brightness, and by using a conversion characteristic curve in which priority is given to the gradation characteristics.

In the signal processing device, the converter may convert the input video signal (or the reproduced video signal) into the output video signal by using at least two of at least two types of conversion characteristic curves. Moreover, the converter may decide a ratio of use of the at least two types of conversion characteristic curves based on a value related to the brightness of the input video signal (or the reproduced video signal).

Note that the parameter calculated in parameter calculator 322 is an example of the ratio of use. Synthesizer 39 is an example of a processor that executes processing for synthesizing a first converted video signal, which is based on first conversion characteristic curve C1, and a second converted video signal, which is based on second conversion characteristic curve C2 with each other corresponding to the ratio of use.

For example, in the example shown in the first exemplary embodiment, in tuner 3, converter 32 decides the ratio of use between the at least two types of the conversion characteristic curves (for example, first conversion characteristic curve C1 and second conversion characteristic curve C2) based on the value related to the brightness of the input video signal (or the reproduced video signal). In such a way, tuner 3 can synthesize the first converted video signal, which is based on first conversion characteristic curve C1, and the second converted video signal, which is based on second conversion characteristic curve C2, by synthesizer 39 in the ratio of use, which is suitable for the brightness of the input video signal (or the reproduced video signal).

In the signal processing device, the first conversion characteristic curve between the at least two types of conversion characteristic curves may be a conversion characteristic curve of converting a signal in the input video signal (or the reproduced video signal), the signal reaching a brightness exceeding the upper limit value of the range of the brightness displayable by the display device, into a signal with a brightness approximate to the upper limit value, and converting a brightness of a signal in the input video signal (or the reproduced video signal), the signal remaining in the range of the brightness displayable by the display device, so that the brightness of the signal can be based on a predetermined standard. Moreover, between the at least two types of conversion characteristic curves, the second conversion characteristic curve may be a conversion characteristic curve of compressing the brightness of the input video signal (or the reproduced video signal) so that the brightness can remain within the range of the brightness displayable by the display device.

Note that first conversion characteristic curve C1 is an example of the first conversion characteristic curve. Second conversion characteristic curve C2 is an example of the second conversion characteristic curve.

For example, in the example shown in the first exemplary embodiment, the input video signal (or the reproduced video signal), in which the maximum brightness is equal to or less than first threshold value T1, is a video signal having a maximum brightness expressible in the dynamic range displayable by display 103 of display device 2. That is to say, this input video signal does not include a high-brightness portion undisplayable by display 103 of display device 2. If tuner 3 converts the brightness of this input video signal (or the reproduced video signal) by using first conversion characteristic curve C1, tuner 3 can convert the input video signal (or the reproduced video signal) into a video signal having lightness approximate to the original lightness, which is inherent in the input video signal (or the reproduced video signal), without generating the pseudo contour and the halation.

Meanwhile, the input video signal (or the reproduced video signal), in which the maximum brightness is larger than second threshold value T2, is a video signal having a maximum brightness undisplayable by display 103 of display device 2. If tuner 3 converts the brightness of this input video signal (or the reproduced video signal) by using second conversion characteristic curve C2, tuner 3 can convert the input video signal (or the reproduced video signal) into a video signal in which gradation characteristics are maintained though lightness is reduced more than the original lightness inherent in the input video signal (or the reproduced video signal).

The value related to the brightness of the input video signal (or the reproduced video signal) may be included in additional information added in advance to the input video signal.

For example, in the example shown in the first exemplary embodiment, the value related to the brightness of the input video signal (or the reproduced video signal) is included in the additional information added in advance to the input video signal, and accordingly, tuner 3 can directly acquire information, which is related to the brightness of the input video signal, from the additional information. Moreover, video recorder/reproducer 101 can store the additional information together with the input video signal.

In the signal processing device, the value related to the brightness of the input video signal (or the reproduced video signal) may be at least one of: a maximum brightness in one frame of the input video signal (or the reproduced video signal); an average brightness in one frame of the input video signal (or the reproduced video signal); an average maximum brightness per frame, which is calculated from maximum brightnesses in a predetermined number of frames of the input video signal (or the reproduced video signal); a brightness histogram in one frame of the input video signal (or the reproduced video signal); and a motion vector per unit pixel block included in the input video signal (or the reproduced video signal).

For example, in the example shown in the first exemplary embodiment, for the value related to the brightness of the input video signal, tuner 3 may use at least one of: a maximum brightness in one frame of the input video signal; an average brightness in one frame of the input video signal; an average maximum brightness per frame, which is calculated from maximum brightnesses in a predetermined number of frames of the input video signal; a brightness histogram in one frame of the input video signal; and a motion vector per unit pixel block included in the input video signal.

In the signal processing device, the converter may reflect a ratio of use, which was used immediately before, on a ratio of use, which is calculated at present.

Note that time constant processor 36 is an example of a processor that executes processing for reflecting the ratio of use, which was used immediately before, on the ratio of use, which is calculated at present.

For example, in the example shown in the first exemplary embodiment, in tuner 3, the parameter used immediately before is reflected on the parameter calculated at present, and accordingly, generation of a sudden change can be suppressed in a conversion result of the brightness for each frame. Hence, video recording/reproducing device 100 including tuner 3 can suppress generation of flickering for each frame on the video to be displayed on display 103 of display device 2.

In the signal processing device, the converter may set the ratio of use of the first conversion characteristic curve to 100% in a case where the value related to the brightness of the input video signal (or the reproduced video signal) is equal to or less than a first threshold value, may set the ratio of use of the second conversion characteristic curve to 100% in a case where the value related to the brightness of the input video signal (or the reproduced video signal) is equal to or more than a second threshold value larger than the first threshold value, and may set the ratio of use between the first conversion characteristic curve and the second conversion characteristic curve to a predetermined ratio in a case where the value related to the brightness of the input video signal (or the reproduced video signal) stays between the first threshold value and the second threshold value.

Note that the first converted video signal is an example of the video signal converted by using the first conversion characteristic curve. The second converted video signal is an example of the video signal converted by using the second conversion characteristic curve. First threshold value T1 is an example of the first threshold value. Second threshold value T2 is an example of the second threshold value. Linear portion L is an example of a function for deciding the predetermined ratio. The maximum brightness is an example of the value related to the input video signal (or the reproduced video signal).

For example, in the example shown in the first exemplary embodiment, in the case where the maximum brightness is equal to or more than second threshold value T2, in converter 32, the gain information becomes "1", and the parameter also becomes "1". Therefore, in converter 32, the second converted video signal is used by 100% for the output video signal based on Equation 1. Moreover, in the case where the maximum brightness is equal to or less than first threshold value T1, in converter 32, the gain information becomes "0", and the parameter also becomes "0". Therefore, in converter 32, the first converted video signal is used by 100% for the output video signal based on Equation 1. Then, in the case where the maximum brightness stays between first threshold value T1 and second threshold value T2, in converter 32, the gain information takes a predetermined ratio that is based on the relationship of linear portion L, and the parameter also takes the predetermined ratio. Therefore, in converter 32, a signal, which is obtained by synthesizing the first converted video signal and the second converted video signal in the predetermined ratio, becomes the output video signal, based on Equation 1.

In such a way, in tuner 3, the parameter does not become only either one of "0" and "1", and a value between "0" and "1" is also used as the parameter. For example, in a case where the gain information is assigned to either one of "0" and "1" by one threshold value, if the maximum brightness exceeds the threshold value or falls down below the threshold value, then the gain information is switched suddenly. However, if two threshold values are used in order to decide the gain information, "0", "1" and the value between "0" and "1" are used as the gain information. In such a way, in tuner 3, when the maximum brightness varies in a vicinity of the threshold value, sudden switch of the gain information can be suppressed, and such a sudden change of the parameter can be suppressed.

In the signal processing device, the converter may set the ratio of use of the first conversion characteristic curve to 100% in the case where the value related to the brightness of the input video signal (or the reproduced video signal) is equal to or less than the first threshold value, and may set the ratio of use of the second conversion characteristic curve to 100% in the case where the value related to the brightness of the input video signal (or the reproduced video signal) is larger than the first threshold value.

For example, in the example shown in the first exemplary embodiment, converter 32 may set the ratio of use of the first converted video signal, which is based on first conversion characteristic curve C1, to 100% in the case where the maximum brightness is equal to or less than the first threshold value, and may set the ratio of use of the second converted video signal, which is based on second conversion characteristic curve C2, to 100% in the case where the maximum brightness is larger than the first threshold value.

Note that, in parameter calculator 322, the gain information may be directly used as the parameter without providing time constant processor 36.

Note that, in the first exemplary embodiment, the description has been made of such an operation example in which converter 32 of tuner 3 converts the input video signal (or the reproduced video signal) into the output video signal by synthesizing the first converted video signal and the second converted video signal in the predetermined ratio. However, the present disclosure is not limited to this operation example. For example, converter 32 may synthesize first conversion characteristic curve C1 and second conversion characteristic curve C2 in the predetermined ratio, and may convert the input video signal (or the reproduced video signal) into the output video signal by using a conversion characteristic curve after such synthesis. That is to say, in tuner 3, the conversion characteristic curves are not limited to the two types mentioned above, and three or more types thereof may be used.

Note that, in the first exemplary embodiment, the description has been made of such an operation example in which the input video signal (or the reproduced video signal) is converted into the output video signal by converter 32 in each of the case where the HDR flag as the high-brightness flag is added to the input video signal (or the reproduced video signal) and the case where the HDR flag is not added to the input video signal (or the reproduced video signal). However, the present disclosure is not limited to this operation example. For example, in the case where the HDR flag is not added to the input video signal (or the reproduced video signal), converter 32 does not have to convert the input video signal (or the reproduced video signal) into the output video signal. That is to say, converter 32 may convert the input video signal (or the reproduced video signal) to generate the output video signal at a time of having detected that the HDR flag is added to the input video signal (or the reproduced video signal).

Note that these general or specific aspects may be implemented by a system, a method, an integrated circuit, a computer program, and a recording medium, or may be implemented by arbitrary combinations of the system, the method, the integrated circuit, the computer program and the recording medium.

Second Exemplary Embodiment

A description is made below of a second exemplary embodiment with reference to FIG. 9 to FIG. 15.

Note that, in display system 1A shown in the second exemplary embodiment, the same reference numerals are assigned to constituents which perform substantially the same operations as those of the constituents provided in display system 1 shown in the first exemplary embodiment, and a description of these constituents of display system 1A are omitted. A description is mainly made below of different points from those of display system 1 shown in the first exemplary embodiment, and in some cases, a description of substantially the same operations as those of display system 1 shown in the first exemplary embodiment may be omitted.

[2-1. Configuration]

Figure 9:
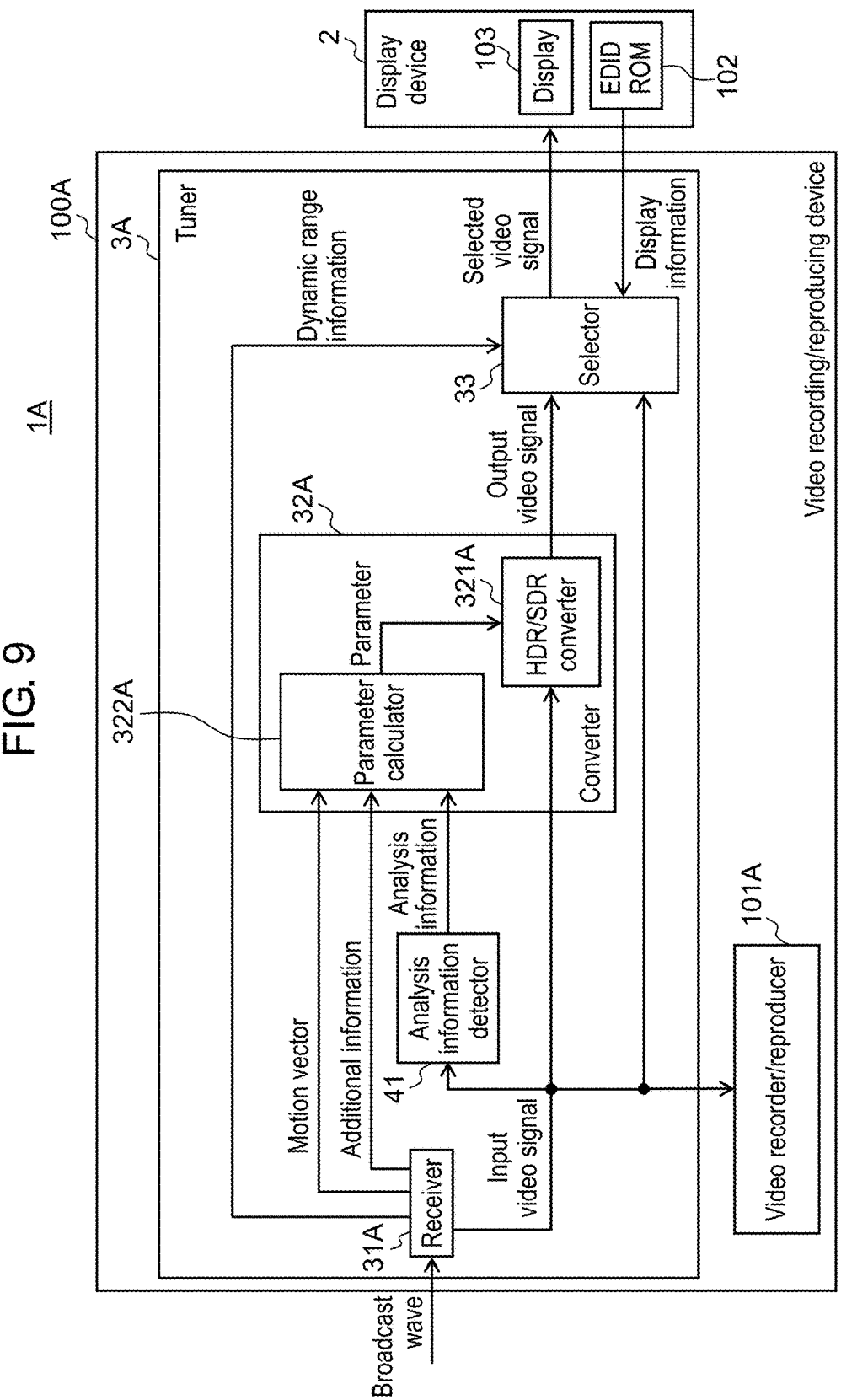
FIG. 9 is a block diagram schematically showing a configuration example of a display system in a second exemplary embodiment.

FIG. 9 is a block diagram schematically showing a configuration example of display system 1A in the second exemplary embodiment.

As shown in FIG. 9, display system 1A includes display device 2 and video recording/reproducing device 100A.

Video recording/reproducing device 100A is, for example, a video recorder that can record a video signal, which is obtained by receiving a broadcast wave, in an HDD, an optical disc, a semiconductor memory or the like. Video recording/reproducing device 100A transmits, to display device 2, a reproduced signal (reproduced video signal) of the recorded video signal and a video signal (received video signal) obtained by receiving the broadcast wave, and can thereby display a video, which is brought by this video signal, on display 103 of display device 2.

Video recording/reproducing device 100A includes video recorder/reproducer 101A and tuner 3A. Video recorder/reproducer 101A can record the video signal obtained by receiving the broadcast wave in tuner 3A, and can output the reproduced video signal obtained by reproducing the recorded video signal. Note that, in FIG. 9, a transmission path of the reproduced video signal output from video recorder/reproducer 101A is omitted. Functions owned by video recorder/reproducer 101A are substantially the same as video recording/reproducing functions provided in general video recorders, and accordingly, a detailed description thereof is omitted.

Video recording/reproducing device 100A and display device 2 are connected to each other, for example, by an HDMI cable. Video recording/reproducing device 100A can transmit the video signal to display device 2 through this HDMI cable.

Note that a cable that connects video recording/reproducing device 100A and display device 2 to each other is not limited to the HDMI cable. Video recording/reproducing device 100A and display device 2 may be connected to each other, for example, by a generally used video cable or other cables. Alternatively, video recording/reproducing device 100A and display device 2 may be connected to each other by radio such as Bluetooth (registered trademark).

Note that, in this exemplary embodiment, a description is made of an operation example where video recording/reproducing device 100A transmits the video signal (received video signal), which is obtained by receiving the broadcast wave, to display device 2. A description of an operation where video recording/reproducing device 100A transmits the reproduced video signal to display device 2 is omitted. In this exemplary embodiment, these two operations are substantially the same except for whether the video signal is the reproduced video signal or the received video signal.

Note that FIG. 9 only shows constituents, which are related to this exemplary embodiment, among a plurality of constituents provided in video recording/reproducing device 100A, and the other constituents are omitted. The other constituents include constituents provided generally in a video recorder. A description of these constituents is omitted.

In this exemplary embodiment, the description is made of the configuration example where display device 2 is the low-brightness display device. Hence, in this exemplary embodiment, a description is made of an operation example where display device 2 transmits the SDR information as the display information to video recording/reproducing device 100A. Note that display device 2 may be the high-brightness display device. In this case, display device 2 transmits the HDR information as the display information to video recording/reproducing device 100A. Note that video recording/reproducing device 100A may determine that display device 2 is the low-brightness display device in a case where neither the SDR information nor the HDR information is transmitted from display device 2.

[2-1.1. Tuner]

As shown in FIG. 9, tuner 3A in the second exemplary embodiment has substantially the same configuration as that of tuner 3 described in the first exemplary embodiment. In addition to this configuration, tuner 3A further includes analysis information detector 41. That is to say, tuner 3A provided in video recording/reproducing device 100A of this exemplary embodiment includes receiver 31A, analysis information detector 41, converter 32A and selector 33.

Receiver 31A is a circuit that converts a broadcast wave, which is input through an antenna, into an input video signal.

Receiver 31A outputs additional information, which is added to an input video signal, to parameter calculator 322A of converter 32A. Moreover, receiver 31A outputs the input video signal to analysis information detector 41, HDR/SDR converter 321A and selector 33. Furthermore, receiver 31A outputs dynamic range information, which is added to the input video signal, to selector 33. Moreover, receiver 31A outputs a motion vector, which is calculated from the input video signal, to converter 32A.

Note that, at a time of recording the input video signal, video recorder/reproducer 101A may store dynamic range information, additional information and a motion vector, which are related to the input video signal, in addition to the input video signal. Moreover, at a time of reproducing the recorded video signal, video recorder/reproducer 101A may output dynamic range information, additional information and a motion vector, which are related to the reproduced video signal, in addition to the reproduced video signal.

That is to say, at the time of reproducing the recorded video signal, video recorder/reproducer 101A may output the reproduced video signal to analysis information detector 41, selector 33 and HDR/SDR converter 321A of converter 32A. Moreover, at the time of reproducing the recorded video signal, video recorder/reproducer 101A may output additional information and a motion vector, which are related to the reproduced video signal, to parameter calculator 322A of converter 32A, and may output dynamic range information, which is related to the reproduced video signal, to selector 33. Note that signal paths of these are omitted in FIG. 9.

Note that, at the time of reproducing the recorded video signal, video recorder/reproducer 101A may calculate the motion vector from the reproduced video signal by a method similar to that performed by receiver 31A, and may output the calculated motion vector to converter 32A.

A description is made below of an operation example where tuner 3A operates based on the input video signal output from receiver 31A; however, in a case where the recorded video signal is reproduced by video recorder/reproducer 101A, the following input video signal just needs to be interpreted as the reproduced video signal.

Note that a generally used calculation method of the motion vector can be applied to the calculation of the motion vector, and accordingly, a detailed description of the calculation of the motion vector is omitted. Moreover, receiver 31A outputs, as a motion vector (scalar quantity), a sum total of absolute values of motion vectors (vector quantities) of one frame. Hence, with regard to the motion vector output from receiver 31A, a value thereof becomes relatively small in a video in which a motion is relatively slow (or a video in which a motion is relatively small), and a value thereof becomes relatively large in a video in which a motion is relatively fast (or a video in which a motion is relatively large). Note that, for example, receiver 31A may output, as the motion vector (scalar quantity), a maximum value of the absolute values of the motion vectors (vector quantities) of one frame. Alternatively, receiver 31A may output, as the motion vector (scalar quantity), a sum total of absolute values of motion vectors (vector quantities) in which the absolute values reach a predetermined value or more.

Figure 10:
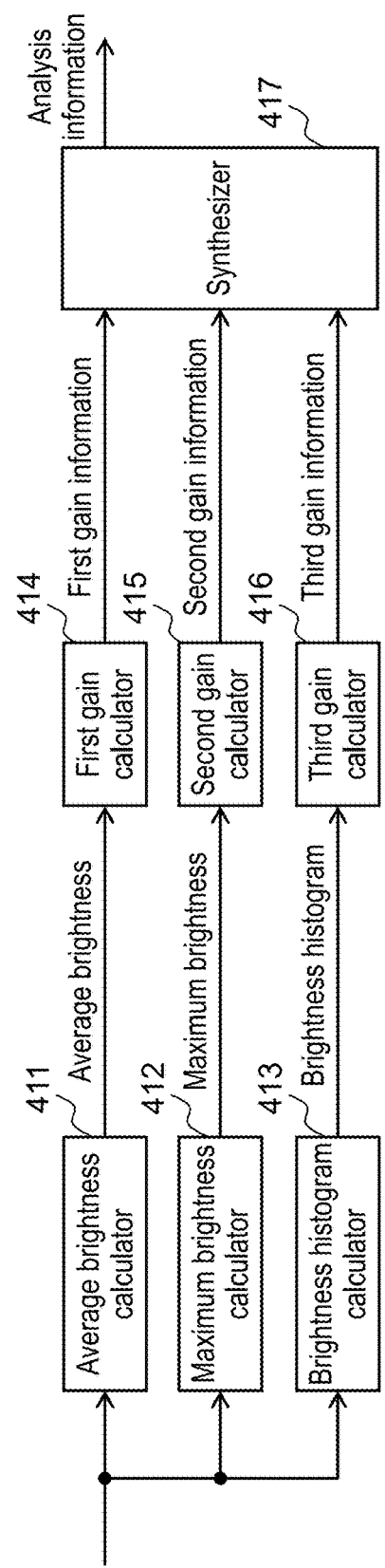
FIG. 10 is a block diagram schematically showing a configuration example of an analysis information detector in the second exemplary embodiment.

FIG. 10 is a block diagram schematically showing a configuration example of analysis information detector 41 in the second exemplary embodiment.

As shown in FIG. 10, analysis information detector 41 includes average brightness calculator 411, maximum brightness calculator 412, brightness histogram calculator 413, first gain calculator 414, second gain calculator 415, third gain calculator 416 and synthesizer 417.

Average brightness calculator 411 is a circuit that calculates an average brightness of the input video signal in one frame. Specifically, average brightness calculator 411 calculates an average value of brightnesses of (substantially) all pixels for one frame brought by the input video signal, and defines a result of the calculation as the average brightness.

Maximum brightness calculator 412 is a circuit that calculates a maximum brightness of the input video signal in one frame. Specifically, maximum brightness calculator 412 calculates a (substantially) maximum value from the brightnesses of (substantially) all pixels for one frame brought by the input video signal, and defines a result of the calculation as the maximum brightness.

Brightness histogram calculator 413 is a circuit that calculates a brightness histogram of the input video signal in one frame. Specifically, brightness histogram calculator 413 calculates a histogram of the brightnesses of all pixels for one frame brought by the input video signal.

Figure 11:
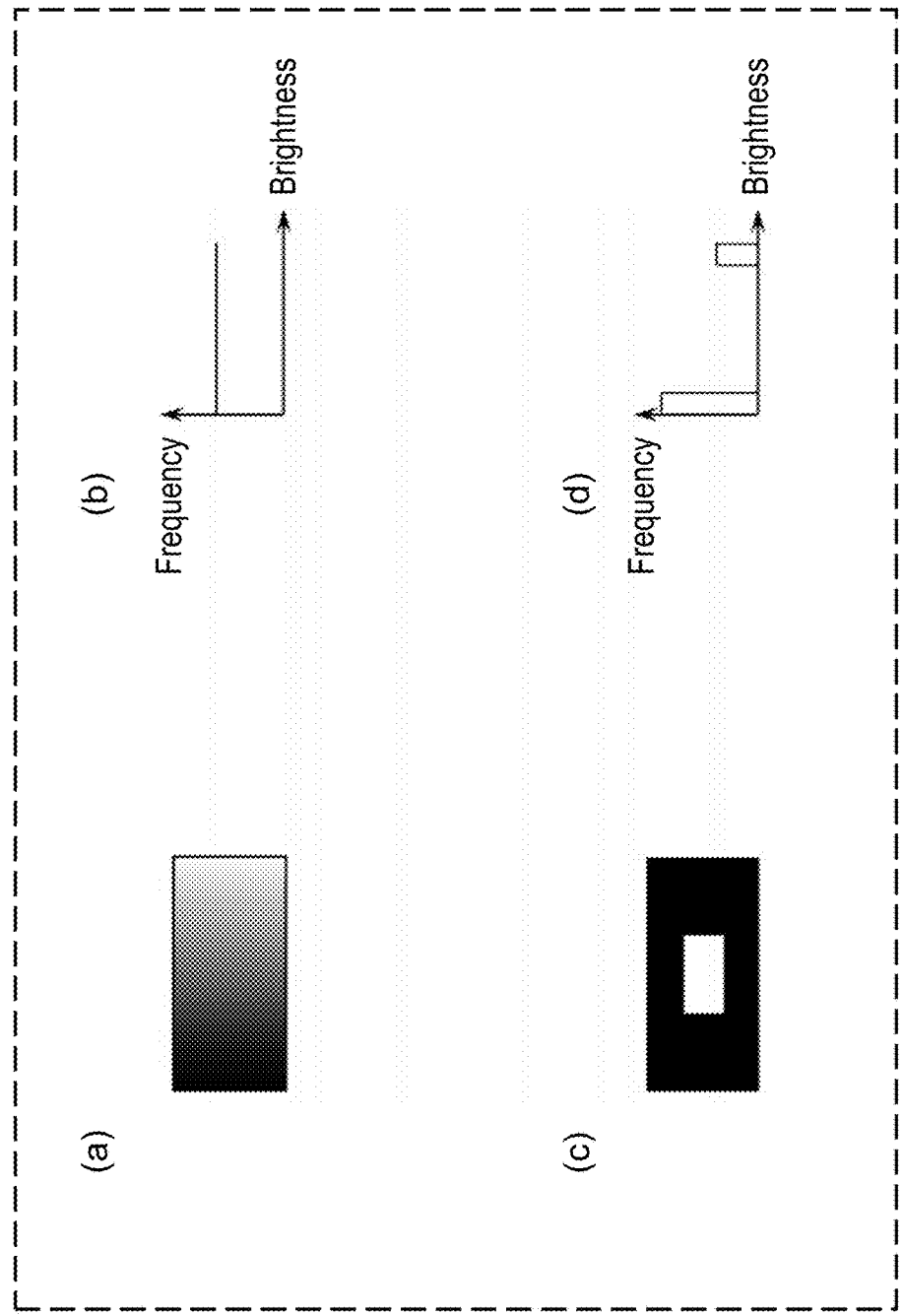
FIG. 11 is diagrams for explaining a brightness histogram in the second exemplary embodiment.

FIG. 11 is diagrams for explaining the brightness histogram in the second exemplary embodiment.

As shown in FIG. 11(a), in a case where an image brought by the input video signal is an image evenly subjected to gradation in one frame, then a frequency of brightness becomes constant as a whole (refer to FIG. 11(b)). Moreover, as shown in FIG. 11(c), in a case where the image brought by the input video signal is an image, which includes a dark portion with a constant brightness and a light portion with a constant brightness in one frame, in which an area of the dark portion is larger, then the frequency of brightness becomes larger in the dark portion (refer to FIG. 11(d)). For the calculation of gain information based on the brightness histogram, a frequency of brightness of a high-brightness portion is required, and accordingly, brightness histogram calculator 413 defines, as the brightness histogram, a frequency of brightness at a high-brightness portion larger than a predetermined threshold value. Here, the predetermined threshold value just needs to be arbitrarily set between 0 and a maximum value of the brightness of the input video signal.

As shown in FIG. 10, first gain calculator 414 is a circuit that calculates first gain information based on the average brightness calculated by average brightness calculator 411. Specifically, gain calculator 35 calculates the first gain information from the maximum brightness by using a first threshold value, a second threshold value larger than the first threshold value, and a graph shown below.

Figure 12:
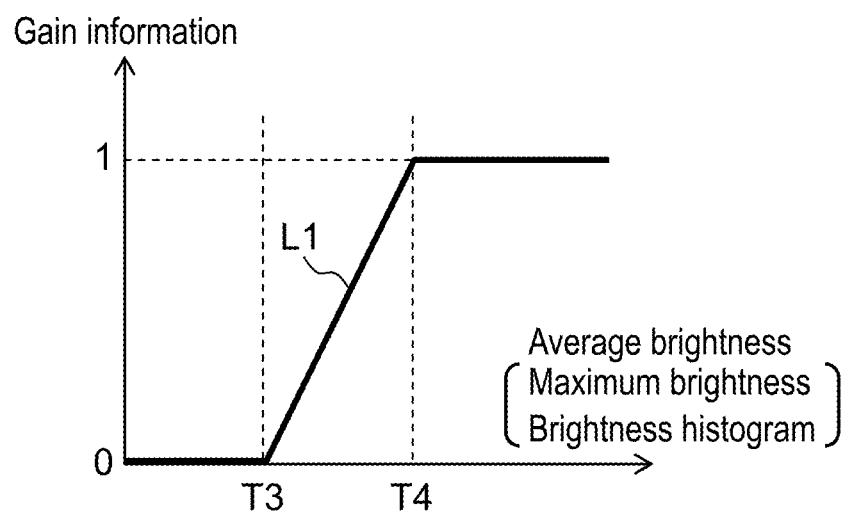
FIG. 12 is a graph showing an example of a relationship between gain information and a maximum brightness in the second exemplary embodiment.

FIG. 12 is a graph showing an example of a relationship between the gain information and the maximum brightness in the second exemplary embodiment.

As shown in FIG. 12, first gain calculator 414 sets the first gain information to "0" in a case where the maximum brightness is equal to or less than first threshold value T3, and sets the first gain information to "1" in a case where the maximum brightness is equal to or more than second threshold value T4. Moreover, the graph shown in FIG. 12 is a linear graph, which connects "0" and "1" to each other, between first threshold value T3 and second threshold value T4. Therefore, first gain calculator 414 defines a value, which is based on this linear portion L1, as the first gain information in a case where the maximum brightness stays between first threshold value T3 and second threshold value T4. This value is the predetermined ratio.

Second gain calculator 415 is a circuit that calculates second gain information based on the maximum brightness calculated by maximum brightness calculator 412.

Third gain calculator 416 is a circuit that calculates third gain information based on the brightness histogram calculated by brightness histogram calculator 413.

Note that second gain calculator 415 and third gain calculator 416 also calculate the respective pieces of gain information by using graphs similar to the graph shown in FIG. 12. However, first threshold value T3 and second threshold value T4 may be individually set to values different among first gain calculator 414, second gain calculator 415 and third gain calculator 416. First threshold value T3 and second threshold value T4 are set to appropriate values based on varieties of experiments, simulations and the like.

As shown in FIG. 10, synthesizer 417 is a circuit that calculates analysis information by synthesizing the first gain information, the second gain information and the third gain information with one another in the predetermined ratio, and outputs the analysis information to parameter calculator 322A. Specifically, synthesizer 417 calculates the analysis information by Equation 3 shown below:

$$\text{Analysis information} = \text{first gain information} \times \beta_1 + \text{second gain information} \times \beta_2 + \text{third gain information} \times (1-\beta_1-\beta_2) \quad \text{(Equation 3)}$$

$\beta_1$ and $\beta_2$ are weighting coefficients, and are values which satisfy a following relationship: $0 \leq \beta_1 \leq 1$, $0 \leq \beta_2 \leq 1$, $\beta_1+\beta_2 \leq 1$. $\beta_1$ and $\beta_2$ are set to appropriate values based on varieties of experiments, simulations and the like.

Parameter calculator 322A is a circuit that calculates a parameter for converting the input video signal. Parameter calculator 322A calculates the parameter based on the additional information input from receiver 31A (or video recorder/reproducer 101A), on the analysis information input from analysis information detector 41, and on the motion vector input from receiver 31A (or video recorder/reproducer 101A).

Figure 13:
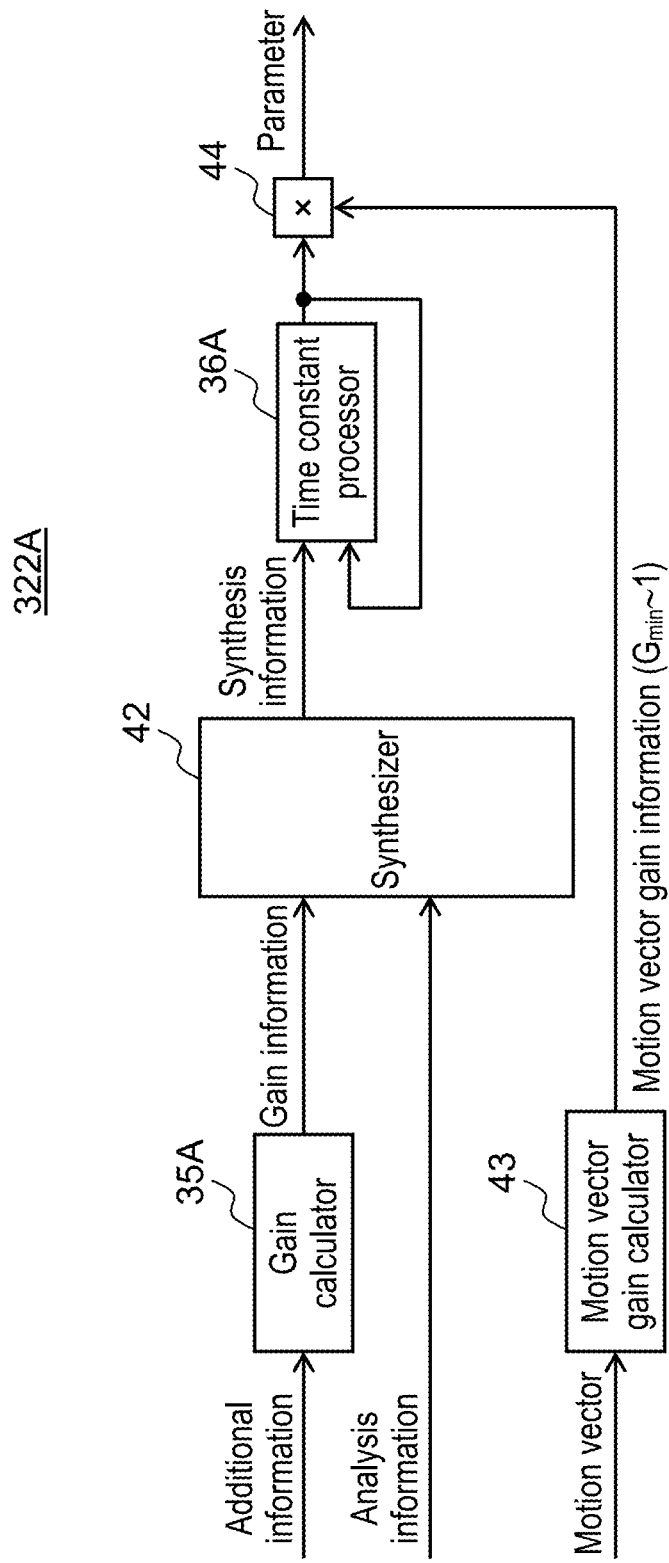
FIG. 13 is a block diagram schematically showing a configuration example of a parameter calculator in the second exemplary embodiment.

FIG. 13 is a block diagram schematically showing a configuration example of parameter calculator 322A in the second exemplary embodiment.

As shown in FIG. 13, parameter calculator 322A includes gain calculator 35A, synthesizer 42, time constant processor 36A, motion vector gain calculator 43 and integrator 44.

Gain calculator 35A is a circuit that calculates gain information based on the maximum brightness input as the additional information from receiver 31A (or video recorder/reproducer 101A). Specifically, gain calculator 35A calculates the gain information from the maximum brightness by using first threshold value T1, second threshold value T2 larger than the first threshold value, and the graph of FIG. 7. Gain calculator 35A is substantially the same as gain calculator 35 shown in the first exemplary embodiment, and accordingly, a detailed description thereof is omitted.

Synthesizer 42 is a circuit that generates synthesis information by synthesizing the gain information input from gain calculator 35A and the analysis information input from analysis information detector 41 with each other in the predetermined ratio, and outputs the synthesis information to time constant processor 36A. Specifically, synthesizer 42 generates the synthesis information by Equation 4 shown below:

$$\text{Synthesis information} = \text{calculated gain information} \times \delta + \text{analysis information} \times (1-\delta) \quad \text{(Equation 4)}$$

$\delta$ is a weighting coefficient, and is a value that satisfies a following relationship: $0 \leq \delta \leq 1$. $\delta$ is set to an appropriate value based on varieties of experiments, simulations and the like.

Time constant processor 36A is a circuit that calculates a next parameter based on the current synthesis information calculated by synthesizer 42, and based on a parameter calculated immediately before by time constant processor 36A, and outputs the calculated parameter to integrator 44. Specifically, time constant processor 36A calculates the parameter, for example, from Equation 5 shown below:

$$\text{Parameter} = \text{calculated synthesis information} \times \gamma + \text{parameter calculated immediately before by time constant processor } \mathbf{36A} \times (1-\gamma) \quad \text{(Equation 5)}$$

$\gamma$ is a weighting coefficient, and is a value that satisfies a following relationship: $0 \leq \gamma \leq 1$. $\gamma$ is set to an appropriate value based on varieties of experiments, simulations and the like.

Motion vector gain calculator 43 is a circuit that calculates motion vector gain information based on the motion vector input from receiver 31A (or video recorder/reproducer 101A), and outputs the calculated motion vector gain information to integrator 44. Specifically, motion vector gain calculator 43 calculates the motion vector gain information from the motion vector by using a first threshold value, a second threshold value larger than the first threshold value, and a graph shown below.

Figure 14:
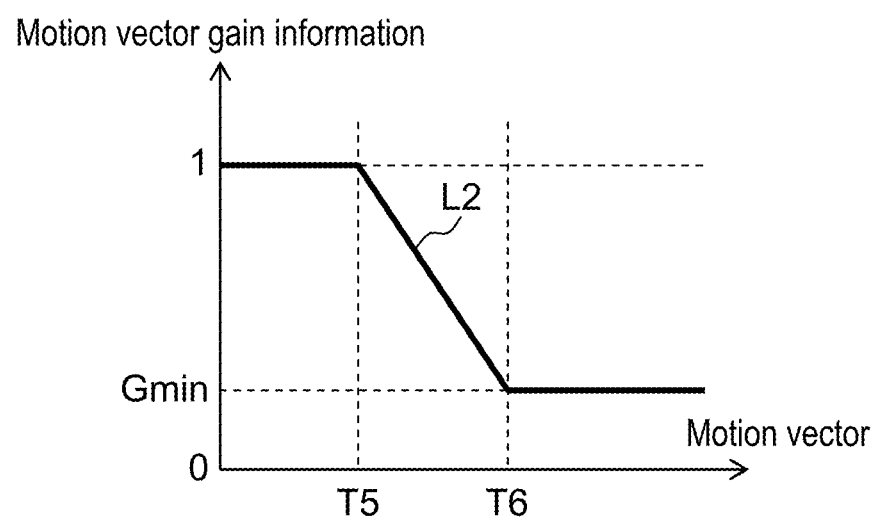
FIG. 14 is a graph showing an example of a relationship between motion vector gain information and a motion vector in the second exemplary embodiment.

FIG. 14 is a graph showing an example of a relationship between the motion vector gain information and the motion vector in the second exemplary embodiment.

As shown in FIG. 14, motion vector gain calculator 43 sets the motion vector gain information to "1" in a case where the motion vector is equal to or less than first threshold value T5, and sets the motion vector gain information to "Gmin" in a case where the motion vector is equal to or more than second threshold value T6. Gmin is a value that satisfies a following relationship: 0<Gmin<1.

Moreover, the graph shown in FIG. 14 is a linear graph, which connects "1" and "Gmin" to each other, between first threshold value T5 and second threshold value T6. Therefore, motion vector gain calculator 43 defines a value, which is based on this linear portion L2, as the motion vector gain information in a case where the motion vector stays between first threshold value T5 and second threshold value T6.

Hence, with regard to the motion vector gain information output from motion vector gain calculator 43, a value thereof becomes relatively large in a video in which a motion is relatively slow (or a video in which a motion is relatively small), and a value thereof becomes relatively small in a video in which a motion is relatively fast (or a video in which a motion is relatively large).

As shown in FIG. 13, integrator 44 is a circuit that integrates the motion vector gain, which is calculated by motion vector gain calculator 43, onto the parameter calculated by time constant processor 36A, and outputs a parameter, which is calculated by this integration, to HDR/SDR converter 321A.

Hence, with regard to the parameter output from integrator 44, a value thereof becomes relatively large in the video in which the motion is relatively slow (or the video in which the motion is relatively small), and a value thereof becomes relatively small in the video in which the motion is relatively fast (or the video in which the motion is relatively large).

As shown in FIG. 9, HDR/SDR converter 321A is a circuit that generates the output video signal in such a manner as follows. That is, HDR/SDR converter 321 implements brightness conversion processing for the input video signal by using a parameter calculated by parameter calculator 322A.

HDR/SDR converter 321A is substantially the same as HDR/SDR converter 321 shown in FIG. 2 in the first exemplary embodiment, and accordingly, a detailed description thereof is omitted. In a similar way to HDR/SDR converter 321, in HDR/SDR converter 321A, the ratio of the first converted video signal becomes relatively large when the value of the parameter is relatively small, and the ratio of the second converted video signal becomes relatively large when the value of the parameter is relatively large. Hence, with regard to the video signal output from HDR/SDR converter 321A, the ratio of the second converted video signal becomes relatively large in the video in which the motion is relatively slow (or the video in which the motion is relatively small), and the ratio of the first converted video signal becomes relatively large in the video in which the motion is relatively fast (or the video in which the motion is relatively large).

As shown in FIG. 9, selector 33 is a circuit that receives the input video signal, the output video signal obtained by converting the input video signal by converter 32A, the dynamic range information and the display information, selects either one of the input video signal and the output video signal based on the dynamic range information and the display information, and outputs the selected signal to display device 2.

Specifically, in a case of having received the HDR flag as the dynamic range information, and having acquired the SDR information as the display information from display device 2, selector 33 selects the output video signal, and outputs the output video signal to display device 2. In other words, in a case where the input video signal is the video signal for the high-brightness display device, and display device 2 is the low-brightness display device, selector 33 selects the output video signal, and outputs the output video signal to display device 2. Moreover, in a case of having received the SDR flag as the dynamic range information, and having acquired the SDR information as the display information from display device 2, selector 33 selects the input video signal, and outputs the input video signal to display device 2. In other words, in a case where the input video signal is the video signal for the low-brightness display device, and display device 2 is the low-brightness display device, selector 33 selects the input video signal, and outputs the input video signal to display device 2.

Note that, in a case of having acquired the HDR information as the display information from display device 2, selector 33 may select the input video signal and output the input video signal to display device 2 regardless of the dynamic range information. Moreover, in a case of having received the SDR flag or not having received the HDR flag, selector 33 may select the input video signal and output the input video signal to display device 2 regardless of the display information. Moreover, in a case of having received neither the SDR flag nor the HDR flag, selector 33 may operate on the assumption of having received the SDR flag. Moreover, in a case where neither the SDR information nor the HDR information is transmitted from display device 2, the selector 33 may operate on the assumption of having acquired the SDR information as the display information.

[2-2. Operations]

A description is made below of operations of tuner 3A configured as described above.

Figure 15:
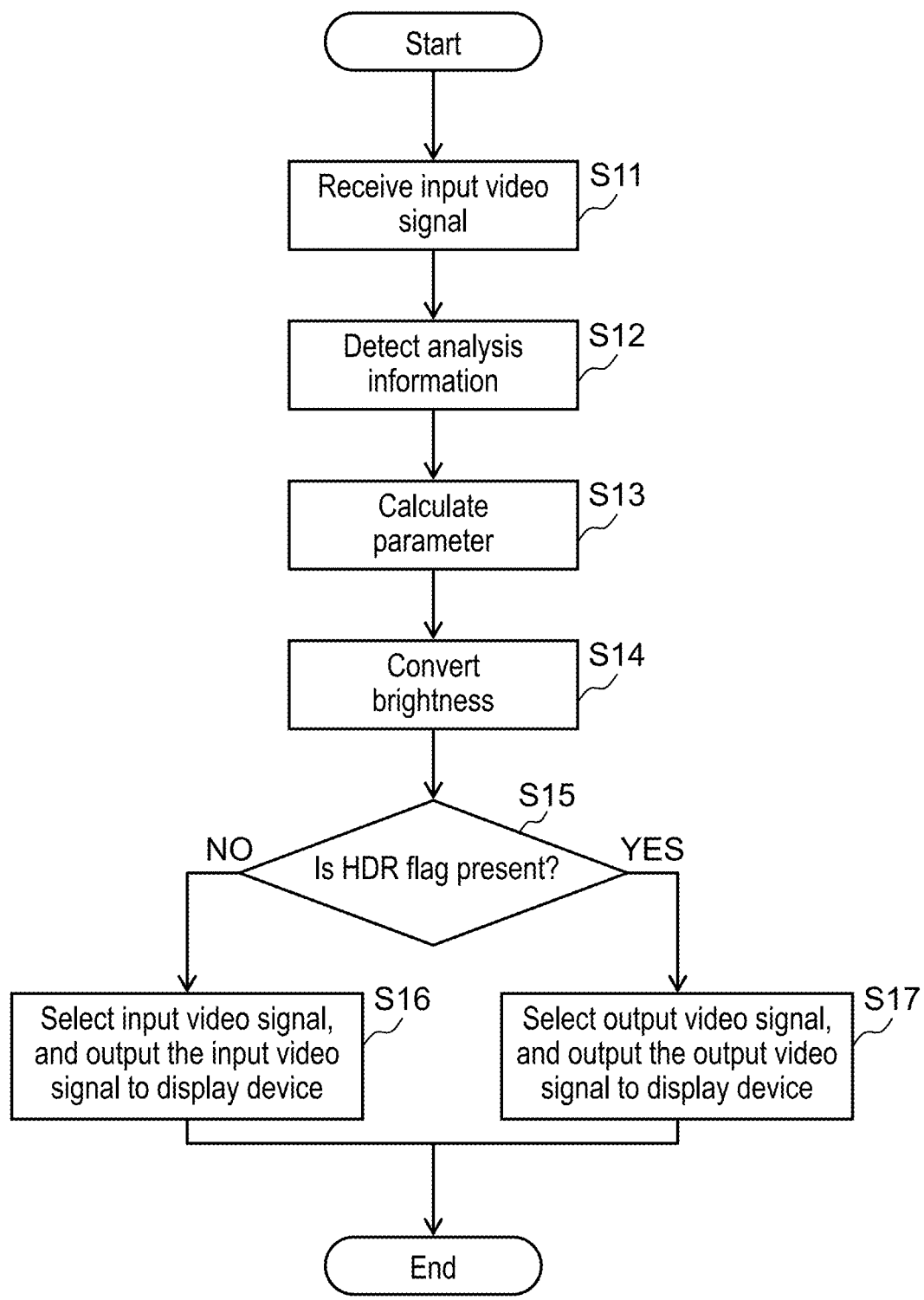
FIG. 15 is a flowchart showing an example of a signal processing method executed in a tuner in the second exemplary embodiment.

FIG. 15 is a flowchart showing an example of a signal processing method executed in tuner 3A in the second exemplary embodiment.

Upon receiving the broadcast wave from the antenna, receiver 31A converts the received broadcast wave into the input video signal. Then, receiver 31A outputs the additional information, which is added to the input video signal, and the motion vector, which is calculated from the input video signal, to parameter calculator 322A. Moreover, receiver 31A outputs the input video signal to HDR/SDR converter 321A, selector 33 and analysis information detector 41. Moreover, receiver 31A outputs the dynamic range information, which is added to the input video signal, to selector 33 (Step S11).

Note that, at the time of reproducing the recorded video signal, video recorder/reproducer 101A outputs the reproduced video signal to HDR/SDR converter 321A, selector 33 and analysis information detector 41. Moreover, video recorder/reproducer 101A outputs the additional information and the motion vector, which are related to the reproduced video signal, to parameter calculator 322A, and outputs dynamic range information, which is related to the reproduced video signal, to selector 33.

Upon receiving the input video signal from receiver 31A (or the reproduced video signal from video recorder/reproducer 101A), analysis information detector 41 calculates the average brightness, maximum brightness and brightness histogram of the input video signal (or the reproduced video signal) per frame, and detects the analysis information based on these. Then, analysis information detector 41 outputs the analysis information to parameter calculator 322A (Step S12).

Parameter calculator 322A calculates the parameter based on the additional information input from receiver 31A (or video recorder/reproducer 101A), on the analysis information input from analysis information detector 41, and on the motion vector input from receiver 31A (or video recorder/reproducer 101A), and outputs the calculated parameter to HDR/SDR converter 321A (Step S13).

HDR/SDR converter 321A performs brightness conversion, which is based on the parameter, for the input video signal input from receiver 31A (or the reproduced video signal from video recorder/reproducer 101A), thereby converts the input video signal (or the reproduced video signal) into the output video signal, and outputs the output video signal to selector 33 (Step S14).

Selector 33 determines whether or not the HDR flag has been input from receiver 31A. Moreover, selector 33 confirms the display information acquired from display device 2 (Step S15).

In a case of having determined that the HDR flag has not been input and having determined that the SDR information has been acquired as the display information in Step S15 (NO in Step S15), selector 33 selects the input video signal and outputs the selected input video signal to display device 2 (Step S16).

Note that, in a case of having determined that the HDR information has been acquired as the display information in Step S15, selector 33 may advance the processing to Step S16.

In a case of having determined that the HDR flag has been input and having determined that the SDR information has been acquired as the display information in Step S15 (YES in Step S15), selector 33 selects the output video signal and outputs the selected output video signal to display device 2 (Step S17).

Tuner 3A executes processing, which is based on this flowchart, for the input video signal (or the reproduced video signal) of each frame.

[2-3. Effects and the Like]

As described above, in this exemplary embodiment, the signal processing device further includes the analysis information detector that analyzes the input video signal (or the reproduced video signal) and detects the analysis information. Then, the value related to the brightness of the input video signal (or the reproduced video signal) is included in the analysis information detected by analyzing the input video signal (or the reproduced video signal) in the analysis information detector.

Note that display device 2 is an example of the display device. Tuner 3A is an example of the signal processing device. Converter 32A is an example of the converter. The parameter calculated in parameter calculator 322A is an example of the ratio of use. Time constant processor 36A is an example of a processor that executes processing for reflecting the ratio of use, which was used immediately before, on the ratio of use, which is calculated at present. Analysis information detector 41 is an example of the analysis information detector. The SDR information is an example of the information indicating that the display device is the low-brightness display device. Video recording/reproducing device 100A is an example of the video recording/reproducing device. Video recorder/reproducer 101A is an example of the video recorder/reproducer.

For example, in the example shown in the second exemplary embodiment, tuner 3A further includes analysis information detector 41 that analyzes the input video signal (or the reproduced video signal) and detects the analysis information. Then, the value related to the brightness of the input video signal (or the reproduced video signal) is included in the analysis information detected by analyzing the input video signal (or the reproduced video signal) in the analysis information detector.

Hence, even if the value related to the brightness is not added to the input video signal (or the reproduced video signal), tuner 3A can calculate the value related to the brightness.

Particularly, in this exemplary embodiment, tuner 3A calculates the parameter by integrally using the analysis information and the additional information, and accordingly, is capable of calculating a parameter more suitable for the input video signal (or the reproduced video signal).

Other Exemplary Embodiments

As described above, the description has been made of the first and second exemplary embodiments as exemplary illustrations of the technology disclosed in the present application. However, the technology in the present disclosure is not limited to this, and is applicable also to exemplary embodiments, which are appropriately subjected to alteration, replacement, addition, omission, and the like. Moreover, it is also possible to constitute new exemplary embodiments by combining the respective constituent elements, which are described in the foregoing first and second exemplary embodiments, with one another.

Here, other exemplary embodiments are exemplified below.

In the first and second exemplary embodiments, exemplary descriptions have been made of the case where tuner 3 (3A) mounted on video recording/reproducing device 100 (100A) is the signal processing device. However, the signal processing device may be a separate body from video recording/reproducing device 100 (100A). As such a signal processing device separate from video recording/reproducing device 100 (100A), for example, there can be applied a tuner device, an optical disc reproduction device, a game machine, a personal computer, a smart phone, a cellular phone, a tablet instrument, and the like. Note that, in this case, the signal processing device and the video recording/reproducing device are made communicable with each other in advance by wire or radio, whereby the information indicating the dynamic range displayable by the display 103 of display device 2 can be output from the video recording/reproducing device to the signal processing device.

Moreover, as a distribution method of the video signal, there are mentioned a distribution by recording media, a distribution by the Internet, and the like as well as such a distribution by the broadcast wave, which is as mentioned above. As the recording media, there are mentioned optical media such as a BLU-RAY (registered trademark) DISC, a flash memory such as an SD card, and the like.

In the first and second exemplary embodiments, the description has been made of the configuration in which tuner 3 (3A) is provided in video recording/reproducing device 100 (100A); however, the present disclosure is not limited to this configuration. Tuner 3 (3A) may be provided, for example, in a set top box, or alternatively, may be provided in a computer or the like having a function to receive the broadcast wave and output the video signal.

Video recording/reproducing device 100 (100A) may be configured to receive an input of the display information, which is made by a user. This configuration is useful in a case where there is no path for transmitting the display information from display device 2 to video recording/reproducing device 100 (100A) (for example, in a case of a break in a cable, and the like).

Note that, in the above-described first and second exemplary embodiments, the respective constituents may be composed of dedicated hardware, or may be realized by executing software programs suitable for the respective constituents by a processor. The respective constituents may be realized in such a manner that a program execution unit such as a CPU (Central Processing Unit) or a processor reads out and executes a software program recorded in a recording medium such as a hard disk or a semiconductor memory.

Moreover, the present disclosure may be the above-described program, or may be a non-transitory computer-readable recording medium in which the above-described program is recorded.

As described above, the description has been made of the exemplary embodiments as the exemplary illustrations of the technology disclosed in the present disclosure. For this description, the accompanying drawings and the detailed description are provided.

Hence, the constituents described in the accompanying drawings and the detailed description can include not only constituents, which are essential for solving the problem, but also constituents, which are provided for exemplifying the above-described technology, and are not essential for solving the problem. Therefore, it should not be immediately recognized that such non-essential constituents are essential based on the fact that the non-essential constituents are described in the accompanying drawings and the detailed description.

Moreover, the above-mentioned exemplary embodiments are those for exemplifying the technology in the present disclosure, and accordingly, can be subjected to varieties of alterations, replacements, additions, omissions and the like within the scope of claims or within the scope of equivalents thereof.

INDUSTRIAL APPLICABILITY

The present disclosure is applicable to the signal processing device, the video recording/reproducing device, the signal processing method, and the program, which process the video signal conforming to the standard that handles HDR. Specifically, the present disclosure is applicable to a video recording/reproducing device such as a video recorder, and the like.

REFERENCE MARKS IN THE DRAWINGS 1, 1A: display system
2: display device
3, 3A: tuner
31, 31A: receiver
32, 32A: converter
33: selector
35, 35A: gain calculator
36, 36A: time constant processor
37: first gradation converter
38: second gradation converter
39, 42, 417: synthesizer
41: analysis information detector
43: motion vector gain calculator
100, 100A: video recording/reproducing device
101, 101A: video recorder/reproducer
102: EDID ROM
103: display
321, 321A: HDR/SDR converter
322, 322A: parameter calculator
411: average brightness calculator
412: maximum brightness calculator
413: brightness histogram calculator
414: first gain calculator
415: second gain calculator
416: third gain calculator

The invention claimed is:

1. A signal processing device that outputs a video signal to a display device, the signal processing device comprising:
a converter that converts an input video signal into an output video signal for a low-brightness display device in which an upper limit value of a range of a displayable brightness is smaller than an upper limit value in a high-brightness display device; and
a selector that receives the input video signal and the output video signal, selects one of the input video signal and the output video signal, and outputs the selected video signal to the display device,
wherein the selector selects the output video signal in a case where a high-brightness flag indicating a video signal for the high-brightness display device is added to the input video signal, and where information indicating that the display device is the low-brightness display device is acquired or information indicating that the display device is the high-brightness display device is not acquired, and selects the input video signal in a case where the high-brightness flag is not added to the input video signal.

2. The signal processing device according to claim 1, wherein the converter converts the input video signal into the output video signal by using at least one of at least two types of conversion characteristic curves.

3. The signal processing device according to claim 2, wherein the converter converts the input video signal into the output video signal by using at least two of the at least two types of conversion characteristic curves, and decides a ratio of use of the at least two types of conversion characteristic curves based on a value related to a brightness of the input video signal.

4. The signal processing device according to claim 3, wherein, between the at least two types of conversion characteristic curves, a first conversion characteristic curve is a conversion characteristic curve of converting a signal in the input video signal, the signal reaching a brightness exceeding an upper limit value of a range of a brightness displayable by the display device, into a signal with a brightness approximate to the upper limit value, and converting a brightness of a signal in the input video signal, the signal remaining in the range of the brightness displayable by the display device, so that the brightness of the signal is based on a predetermined standard, and
wherein, between the at least two types of conversion characteristic curves, a second conversion characteristic curve is a conversion characteristic curve of compressing the brightness of the input video signal so that the brightness remains within the range of the brightness displayable by the display device.

5. The signal processing device according to claim 4, wherein the converter sets the ratio of use of the first conversion characteristic curve to 100% in a case where the value related to the brightness of the input video signal is equal to or less than a first threshold value, and sets the ratio of use of the second conversion characteristic curve to 100% in a case where the value related to the brightness of the input video signal is larger than the first threshold value.

6. The signal processing device according to claim 4, wherein the converter:
sets the ratio of use of the first conversion characteristic curve to 100% in a case where the value related to the brightness of the input video signal is equal to or less than a first threshold value;
sets the ratio of use of the second conversion characteristic curve to 100% in a case where the value related to the brightness of the input video signal is equal to or more than a second threshold value larger than the first threshold value; and
sets the ratio of use between the first conversion characteristic curve and the second conversion characteristic curve to a predetermined ratio in a case where the value related to the brightness of the input video signal stays between the first threshold value and the second threshold value.

7. The signal processing device according to claim 3, wherein the converter reflects the ratio of use, which was used immediately before, on the ratio of use, which is calculated at present.

8. The signal processing device according to claim 3, wherein the value related to the brightness of the input video signal is included in additional information added in advance to the input video signal.

9. The signal processing device according to claim 3, further comprising an analysis information detector that analyzes the input video signal and detects analysis information,
wherein the value related to the brightness of the input video signal is included in the analysis information detected by analyzing the input video signal in the analysis information detector.

10. The signal processing device according to claim 3, wherein the value related to the brightness of the input video signal is at least one of: a maximum brightness in one frame of the input video signal; an average brightness in one frame of the input video signal; an average maximum brightness per frame, which is calculated from maximum brightnesses in a predetermined number of frames of the input video signal; a brightness histogram in one frame of the input video signal; and a motion vector per unit pixel block included in the input video signal.

11. A video recording/reproducing device comprising:
the signal processing device according to claim 1; and
a video recorder/reproducer.

12. A signal processing method of outputting a video signal to a display device, the signal processing method comprising:
converting an input video signal into an output video signal for a low-brightness display device in which an upper limit value of a range of a displayable brightness is smaller than an upper limit value in a high-brightness display device; and
selecting one of the input video signal and the output video signal and outputting the selected video signal to the display device,
wherein the output video signal is selected in a case where a high-brightness flag indicating a video signal for the high-brightness display device is added to the input video signal, and where information indicating that the display device is the low-brightness display device is acquired or information indicating that the display device is the high-brightness display device is not acquired, and the input video signal is selected in a case where the high-brightness flag is not added to the input video signal.

13. A non-transitory computer-readable recording medium storing a program for outputting a video signal to a display device, the program causing a computer to execute:
converting an input video signal into an output video signal for a low-brightness display device in which an upper limit value of a range of a displayable brightness is smaller than an upper limit value in a high-brightness display device; and
selecting the output video signal and outputting the output video signal to the display device in a case where a high-brightness flag indicating a video signal for the high-brightness display device is added to the input video signal, and where information indicating the low-brightness display device is acquired or information indicating that the display device is the high-brightness display device is not acquired, and selecting the input video signal and outputting the input video signal to the display device in a case where the high-brightness flag is not added to the input video signal.

* * * * *